(12) United States Patent
Nimbalker et al.

(10) Patent No.: US 12,075,437 B2
(45) Date of Patent: Aug. 27, 2024

(54) NR UE POWER SAVING USING L1 INDICATION BASED CROSS-SLOT SCHEDULING

(71) Applicant: Telefonaktiebolaget LM Ericsson (publ), Stockholm (SE)

(72) Inventors: Ajit Nimbalker, Fremont, CA (US); Ilmiawan Shubhi, Malmö (SE); Ravikiran Nory, San José, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 291 days.

(21) Appl. No.: 17/635,443

(22) PCT Filed: Aug. 10, 2020

(86) PCT No.: PCT/EP2020/072334
§ 371 (c)(1),
(2) Date: Feb. 15, 2022

(87) PCT Pub. No.: WO2021/032514
PCT Pub. Date: Feb. 25, 2021

(65) Prior Publication Data
US 2022/0346068 A1    Oct. 27, 2022

Related U.S. Application Data

(60) Provisional application No. 62/887,936, filed on Aug. 16, 2019.

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0053* (2013.01); *H04W 72/0446* (2013.01); *H04W 72/12* (2013.01)

(58) Field of Classification Search
None
See application file for complete search history.

(56) References Cited

U.S. PATENT DOCUMENTS

| 2021/0105716 A1* | 4/2021 | Wu ...................... H04L 41/0806 |
| 2022/0015055 A1* | 1/2022 | Taherzadeh Boroujeni ............... H04L 5/0053 |
| 2023/0199651 A1* | 6/2023 | Ohara ............... H04W 52/0229 370/252 |

OTHER PUBLICATIONS

Japanese Office Action, Japanese Patent Application No. 2022-508522, mailed Feb. 28, 2023, 3 pages.
(Continued)

*Primary Examiner* — Angela Nguyen
(74) *Attorney, Agent, or Firm* — Sage Patent Group

(57) ABSTRACT

A user equipment (UE), method and computer program product are provided. A configuration is received to detect a first field within a first DCI, the UE operating in a first state upon reception of the configuration. While operating in the first state where a minimum slot offset is applicable for at least one of receiving data or transmitting data, the UE switches from operating in the first state to a second state responsive to detecting a first state value for the first field in a first control message using the first DCI format in a first slot of a first set of slots. While operating in the second state where the minimum slot offset is not applicable for at least one of receiving the data and transmitting the data, the UE switches from operating in the second state to the first state responsive to detecting a second state value.

16 Claims, 20 Drawing Sheets

(51) Int. Cl.
*H04W 72/0446* (2023.01)
*H04W 72/12* (2023.01)

(56) References Cited

OTHER PUBLICATIONS

ZTE, Procedure of cross-slot scheduling power saving techniques, 3GPP TSG RAN WG1#97 R1-1906640, Reno, USA, May 13-17, 2019, 4 pages.
Apple Inc. Cross Slot Scheduling for UE Power Saving, 3GPP TSG RAN WG1#97 R1-1907346, Reno, USA, May 13-17, 2019, 10 pages.
International Search Report and Written Opinion of the International Searching Authority, PCT/EP2020/072334, mailed Aug. 10, 2020, 10 pages.
Huawei, et al., 3GPP TSG RAN WG1 #97, 7.2.9.2, "Procedure of cross-slot scheduling for UE power saving", Reno, USA, May 13-17, 2019, 12 pages.
Qualcomm Incorporated, 3GPP TSG-RAN WG1 Meeting #94bis, 7.2.9.2.1, UE Adaptation to the Traffic and UE Power Consumption Characteristics, Chengdu, China, Oct. 8-12, 2018, 17 pages.
Sony, 3GPP TSG RAN WG1 #97, 7.2.9.2, "On cross-slot scheduling for power saving", Reno, USA, May 13-17, 2019, 7 pages.

* cited by examiner

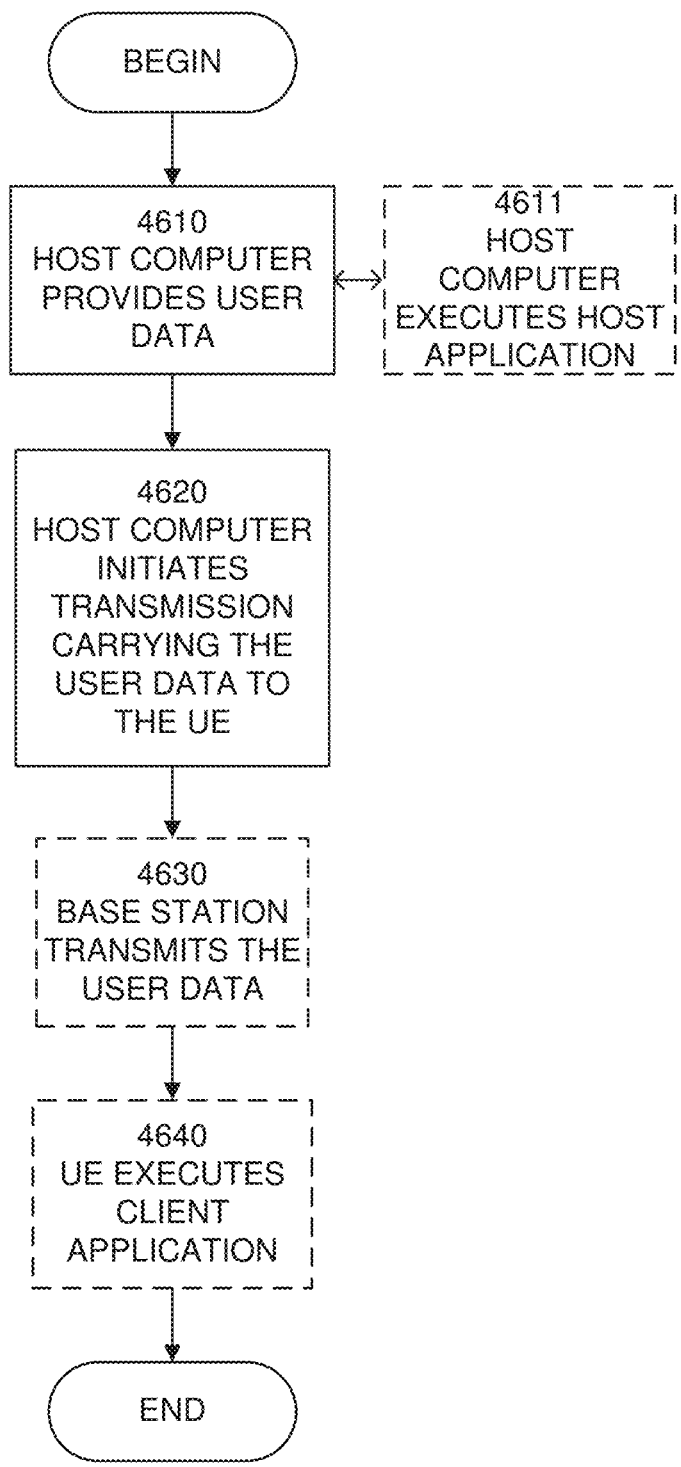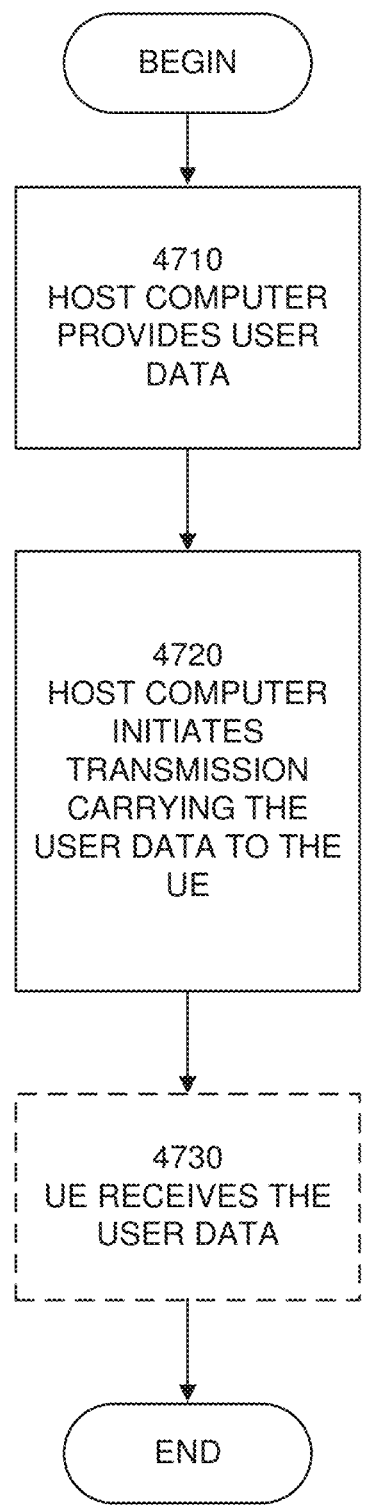
Figure 21
Figure 22

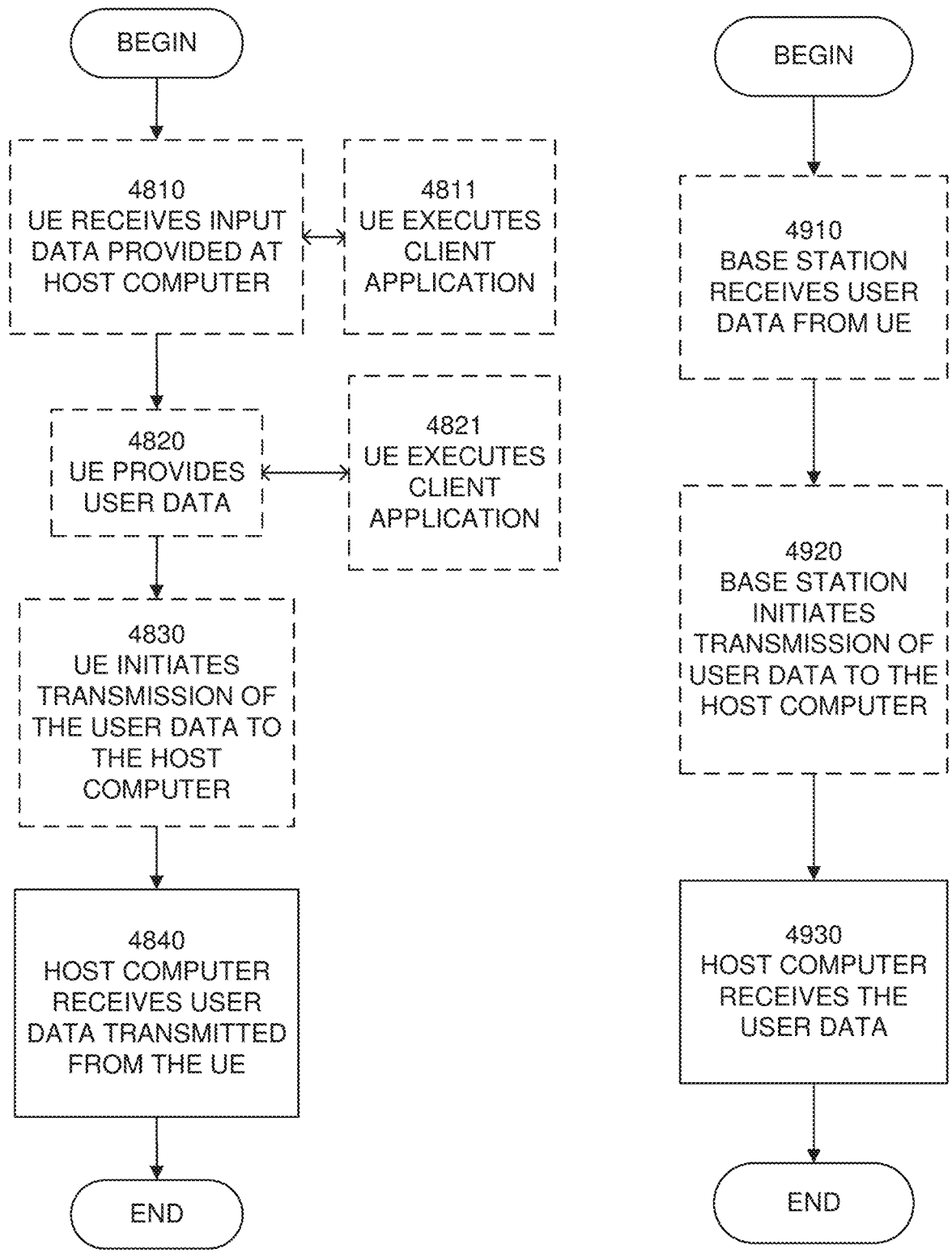

NR UE POWER SAVING USING L1 INDICATION BASED CROSS-SLOT SCHEDULING

CROSS REFERENCE TO RELATED APPLICATIONS

This application is a 35 U.S.C. § 371 national stage application of PCT International Application No. PCT/EP2020/072334 filed on Aug. 10, 2020, which in turn claims domestic priority to U.S. Provisional Patent Application No. 62/887,936, filed on Aug. 16, 2019, the disclosures and content of which are incorporated by reference herein in their entirety.

TECHNICAL FIELD

The present disclosure relates generally to communications, and more particularly to communication methods and related devices and nodes supporting wireless communications.

BACKGROUND

The new radio (NR) standard in 3GPP is being designed to provide service for multiple use cases such as enhanced mobile broadband (eMBB), ultra-reliable and low latency communication (URLLC), and machine type communication (MTC). Each of these services has different technical requirements. For example, the general requirement for eMBB may be high data rate with moderate latency and moderate coverage, while URLLC service may require a low latency and high reliability transmission but perhaps for moderate data rates.

One of the solutions for low latency data transmission can be shorter transmission time intervals. In NR in addition to transmission in a slot, a mini-slot transmission is also allowed to reduce latency. A mini-slot may consist of any number of 1 to 14 OFDM symbols. It should be noted that the concepts of slot and mini-slot are not specific to a specific service meaning that a mini-slot may be used for either eMBB, URLLC, or other services. FIG. 1 is an illustration of radio resource elements in NR.

User Equipment (UE) Power Consumption

UE power consumption may be an important metric that may need to be enhanced. In general, significant power can be spent on monitoring the PDCCH in LTE based on one DRX setting from LTE field logs. The situation can be similar in NR if similar DRY setting with traffic modelling is utilized, as the UE needs to perform blind detection in its configured control resource sets (CORESETs) to identify whether there is a PDCCH sent to it, and act accordingly. Techniques that can reduce unnecessary PDCCH monitoring or allowing UE to go to sleep or wake-up only when required can be beneficial.

NR

The Third Generation Partnership Project 3GPP is defining technical specifications for New Radio (NR)(e.g., 5G). In release 15 (Rel-15) NR, a user equipment (UE) can be configured with up to four carrier bandwidth parts (BWPs) in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) may be defined and numbered from 0 to $N_{BWP,i}^{size}-1$, where i is the index of the carrier bandwidth part. A resource block (RB) is defined as 12 consecutive subcarriers in the frequency domain.

Numerologies

Multiple orthogonal frequency-division multiplexing (OFDM) numerologies, $\mu$, are supported in NR as given by Table 1, where the subcarrier spacing, $\Delta f$, and the cyclic prefix for a carrier bandwidth part are configured by different higher layer parameters for downlink (DL) and uplink (UL), respectively.

TABLE 1

Supported transmission numerologies.

| $\mu$ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following downlink physical channels are defined:

Physical Downlink Shared Channel, PDSCH
Physical Broadcast Channel, PBCH
Physical Downlink Control Channel, PDCCH PDSCH is the main physical channel used for unicast downlink data transmission, but also for transmission of RAR (random access response), certain system information blocks, and paging information. PBCH carries the basic system information, required by the UE to access the network, PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:

Physical Uplink Shared Channel, PUSCH
Physical Uplink Control Channel, PUCCH
Physical Random Access Channel, PRACH PUSCH is the uplink counterpart to the PDSCH. PUCCH is used by UEs to transmit uplink control information, including HARQ acknowledgements, channel state information reports, etc. PRACH is used for random access preamble transmission.

An example contents of a DL DCI 1-0 is shown below with CRC scrambled by C-RNTI/CS_RNTI:

Identifier for DCI formats—1 bits
  The value of this bit field is always set to 1, indicating a DL DCI format
Frequency domain resource assignment—$\lceil \log_2(N_{RB}^{DL,BWP}(N_{RB}^{DL,BWP}+1)/2) \rceil$ bits
  $N_{RB}^{DL,BWP}$ is the size of the active DL bandwidth part in case DCI format 1_0 is monitored in the UE specific search space and satisfying the total number of different DCI sizes configured to monitor is no more than 4 for the cell, and the total number of different DCI sizes with C-RNTI configured to monitor is no more than 3 for the cell otherwise, $N_{RB}^{DL,BWP}$ is the size of CORESET 0.

Time domain resource assignment—4 bits as defined in Subclause 5.1.2.1 of TS 38.214

VRB-to-PRB mapping—1 bit according to Table 7.3.1.1.2-33 of TS 38.213

Modulation and coding scheme—5 bits as defined in Subclause 5.1.3 of TS 38.214

New data indicator—1 bit

Redundancy version—2 bits as defined in Table 7.3.1.1.1-2 of TS 38.212

HARQ process number—4 bits

Downlink assignment index—2 bits as defined in Subclause 9.1.3 of TS 38.213, as counter DAI TPC command for scheduled PUCCH—2 bits as defined in Subclause 7.2.1 of TS 38.213

PUCCH resource indicator—3 bits as defined in Subclause 9.2.3 of TS 38.213

PDSCH-to-HARQ_feedback timing indicator—3 bits as defined in Subclause 92.3 of TS38.213

DRX

DRX (Discontinuous reception): As shown in simplified DRX operation in FIG. 2, DRX allows UE to transition to lower power state where it is not required to receive any transmission from the base station. There is an onDuration where UE is awake and monitors for control channels, and if there is no control message detected by the UE, an Inactivity timer begins, and the UE continues to monitor for control channel until a valid control message addressed to the UE is received or the inactivity timer expires. If the UE receives a valid control message, it extends the Inactivity tinier and continues to monitor the PDCCH. If the inactivity timer expires then UE can stop receiving transmissions from base station (e.g. no control monitoring) until end of the DRX cycle. Typically, the DRX parameters are configured by RRC and there are some other DRX parameters including RTT related, HARQ related, etc. On duration and the time duration when inactivity timer is running is also generally referred to as active time.

In summary the following terms are typically associated with DRX operation

Active Time: Time related to DRX operation, during which the MAC entity monitors the PDCCH.

DRX Cycle: Specifies the periodic repetition of the On Duration followed by a possible period of inactivity (see FIG. 2 below).

Inactivity Timer: Generally, refers to the number of consecutive PDCCH-subframe(s)/slots after the subframe/slot in which a PDCCH indicates an initial UL, DL or SL user data transmission for a MAC entity.

MAC entity is the medium access control entity, and there is one MAC entity per configured cell group, for example the master cell group and secondary cell group.

One main aspect is that DRX functionality is configured by RRC, which is typically operating on a slower scale than MAC or Physical layer. Thus, the DRX parameter settings, etc. cannot be changed quite adaptively through RRC configuration, especially if the UE has a mix of traffic types.

SUMMARY

One problem that may occur with only cross-slot scheduling, which can save power as the UE can go to micro-sleep in between the end of PDCCH reception and start of corresponding PDSCH is that cross-slot scheduling can increase delays. Since cross-slot scheduling can increase delays, UE operation with same-slot scheduling should also be enabled. Thus, a mechanism for fast switching between only cross-slot scheduling and same-slot scheduling is desirable. Existing solutions suffer from deficiencies such efficient transitions, while considering various aspects such as efficient signaling mechanisms, reducing delay for ongoing traffic, and providing more opportunities for UE to save power.

According to some embodiments of inventive concepts, a method in a user equipment (UE) is provided. The method includes receiving a configuration to detect a first field within a first downlink control information, DCI, format, the UE operating in an initial state upon reception of the configuration, the initial state being a first state. The method includes, while operating in the first state where a minimum slot offset is applicable for at least one of receiving data or transmitting data: switching from operating in the first state to operating in a second state different from the first state responsive to detecting a first state value for the first field in a first control message using the first DCI format in a first slot of a first set of slots. The method includes, while operating in the second state where the minimum slot offset is not applicable for at least one of receiving the data and transmitting the data: switching from operating in the second state to the first state responsive to detecting a second state value for the first field in the first slot of a second set of slots.

A wireless device is also provided that is configured to perform analogous operations.

An advantage that may be achieved using various embodiments of inventive concepts described herein is reduced power consumption by fast, robust and physical-layer based transition between cross-slot scheduling and same slot scheduling for data scheduling.

According to some other embodiments of inventive concepts, a method in a radio access network (RAN) node is provided. The method includes transmitting a configuration to detect a first field within a first downlink control information, DCI, format, to a user equipment, UE, the UE operating in an initial state upon reception of the configuration, the initial state being a first state, wherein a minimum slot offset is applicable for at least one of receiving data or transmitting data in the first state. The method includes transmitting a first state value for a first field in a first control message using the first DCI format in a first slot of a first set of slots to indicate to the UE to switch from operating in the first state to operating in a second state different from the first state, wherein a minimum slot offset is not applicable for at least one of receiving data or transmitting data in the second state. The method includes transmitting a second state value for the first field in a second control message using the first DCI format in a second slot of a first set of slots to indicate to the UE to switch from operating in the second state to operating in the first state.

A RAN node is also provided that is configured to perform analogous operations.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 21 is a block diagram of methods implemented in a communication system including a host computer, a base station and a user equipment in accordance with some embodiments;

FIG. 22 is a block diagram of methods implemented in a communication system including a host computer, a base station and a user equipment in accordance with some embodiments;

FIG. 23 is a block diagram of methods implemented in a communication system including a host computer, a base station and a user equipment in accordance with some embodiments; and FIG. 24 is a block diagram of methods implemented in a communication system including a host computer, a base station and a user equipment in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

One problem that may occur with only cross-slot scheduling can save power as UE can go to micro-sleep in between the end of PDCCH reception and start of corresponding PDSCH. However, since cross-slot scheduling can increase delays, UE operation with same-slot scheduling should also be enabled. Thus, a mechanism for fast switching between only cross-slot scheduling and same-slot scheduling is desirable. Existing solutions suffer from deficiencies such efficient transitions, while considering various aspects such as efficient signaling mechanisms, reducing delay for ongoing traffic, and providing more opportunities for UE to save power.

Inventive concepts described below include a method to enable UE operation in cross-slot state or same-slot state and efficient switching between the two states, based on one or more conditions including DCI reception with an explicit or implicit field, absence of DCI reception with a certain state value for a field in a window of slots, absence of DCI reception in a window of slots, and the like.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The inventive concepts described may reduce UE power consumption by fast, robust and physical-layer based transition between a) cross-slot scheduling and b same slot scheduling for data scheduling.

Figure 9:
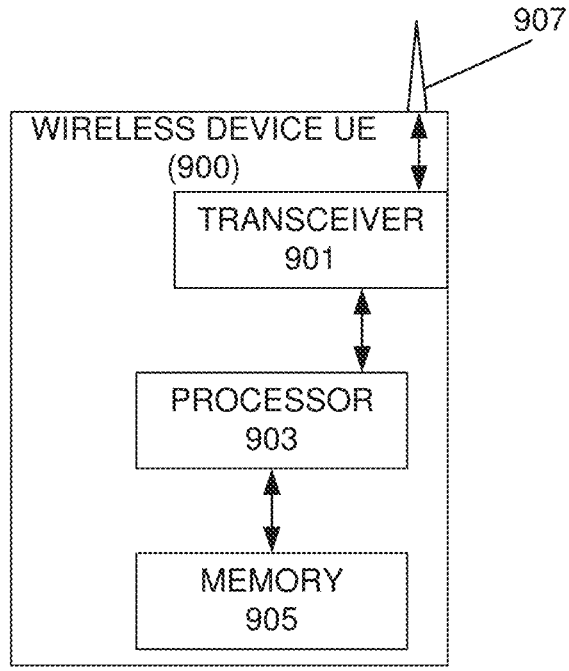
FIG. 9 is a block diagram illustrating a mobile terminal UE according to some embodiments of inventive concepts.

FIG. 9 is a block diagram illustrating elements of a wireless device UE 900 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. (Wireless device 900 may be provided, for example, as discussed below with respect to wireless device 4110 of FIG. 16.) As shown, wireless device UE may include an antenna 907 (e.g., corresponding to antenna 4111 of FIG. 16), and transceiver circuitry 901 (also referred to as a transceiver, e.g., corresponding to interface 4114 of FIG. 16) including a transmitter and a receiver configured to provide uplink and downlink radio communications with a base station(s)(e.g., corresponding to network node 4160 of FIG. 16) of a radio access network. Wireless device UE may also include processing circuitry 903 (also referred to as a processor, e.g., corresponding to processing circuitry 4120 of FIG. 16) coupled to the transceiver circuitry, and memory circuitry 905 (also referred to as memory, e.g., corresponding to device readable medium 4130 of FIG. 16) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that separate memory circuitry is not required. Wireless device UE 900 may also include an interface (such as a user interface) coupled with processing circuitry 903, and/or wireless device UE 900 may be incorporated in a vehicle.

As discussed herein, operations of wireless device UE may be performed by processing circuitry 903 and/or transceiver circuitry 901. For example, processing circuitry 903 may control transceiver circuitry 901 to transmit communications through transceiver circuitry 901 over a radio interface to a radio access network node (also referred to as a base station) and/or to receive communications through transceiver circuitry 901 from a RAN node over a radio interface. Moreover, modules may be stored in memory circuitry 905, and these modules may provide instructions so that when instructions of a module are executed by processing circuitry 903, processing circuitry 903 performs respective operations (e.g., operations discussed below with respect to Example Embodiments relating to wireless devices).

Figure 10:
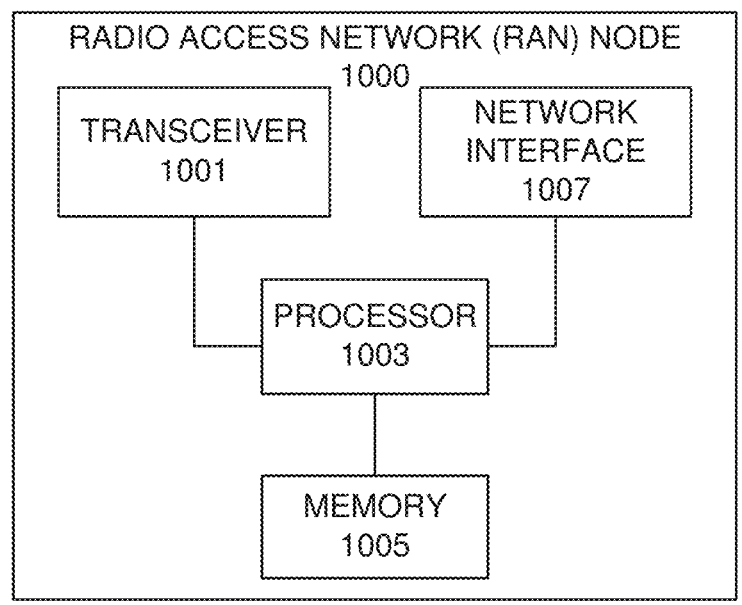
FIG. 10 is a block diagram illustrating a radio access network RAN node (e.g., a base station eNB/gNB) according to some embodiments of inventive concepts.

FIG. 10 is a block diagram illustrating elements of a radio access network RAN node 1000 (also referred to as a network node, base station, eNodeB/eNB, gNodeB/gNB, etc.) of a Radio Access Network (RAN) configured to provide cellular communication according to embodiments of inventive concepts. (RAN node 1000 may be provided, for example, as discussed below with respect to network node 4160 of FIG. 16.) As shown, the RAN node may include transceiver circuitry 1001 (also referred to as a transceiver, e.g., corresponding to portions of interface 4190 of FIG. 16) including a transmitter and a receiver configured to provide uplink and downlink radio communications with mobile terminals. The RAN node may include network interface circuitry 1007 (also referred to as a network interface, e.g., corresponding to portions of interface 4190 of FIG. 16) configured to provide communications with other nodes (e.g. with other base stations) of the RAN and/or core network CN. The network node may also include a processing circuitry 1003 (also referred to as a processor, e.g., corresponding to processing circuitry 4170) coupled to the transceiver circuitry, and a memory circuitry 1005 (also referred to as memory, e.g., corresponding to device readable medium 4180 of FIG. 16) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the RAN node may be performed by processing circuitry 1003, network interface 1007, and/or transceiver 1001. For example, processing circuitry 1003 may control transceiver 1001 to transmit downlink communications through transceiver 1001 over a radio interface to one or more mobile terminals UEs and/or to receive uplink communications through transceiver 1001 from one or more mobile terminals UEs over a radio interface. Similarly, processing circuitry 1003 may control network interface 1007 to transmit communications through network interface 1007 to one or more other network nodes and/or to receive communications through network interface from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to RAN nodes).

The use of scheduling DCI for indicating cross/same slot switching may reduce overhead in transmission of power saving information. While it may be feasible to repurpose some existing fields (with certain pre-determined values) for the 1.1 indication, it may be simpler to include an extra new field in the scheduling DCI for this purpose in the UE-specific search space. Indicating the new field in the scheduling DCI in the common search space is not needed since CSS is used for fallback operation (including size matching with broadcast RNTIs).

Including the field in non-fallback DCI may be enough but it may lead to scheduling restrictions on the network side since it needs to send non-fallback DCI for sending the L1 command. Therefore, the DCI formats in which the field is present can be left as a network choice via configurability.

Configuration of cross-slot scheduling can be per-BWP and the minimum applicable value for K0 and K2, may also be per BWP respectively. K0 denotes a slot offset and can be signaled via time domain resource allocation and can denote a slot offset between the slot in which a scheduling DCI is received and the slot in which the corresponding data (e.g. PDSCH) is to be received. Similarly, K2 denotes a slot offset and can be signaled via time domain resource allocation and can denote a slot offset between the slot in which a scheduling DCI is received and the slot in which the corresponding data (e.g. PUSCH) is to be transmitted.

Higher layer can configure a minimum applicable value for K0 and K1, respectively.

A new bit field (Cross-Slot Indicator field or CSIF) is introduced in DL (or UL) scheduling DCI format(s) in USS for the purpose of L1 signaling indicating cross-slot scheduling state or not on DL (or UL). The field size can be 1 bit or more.

Higher layer configuration may indicate whether the new field for CSIF is present in on or more DCI formats. For example, the higher layer configuration can indicate whether the field in present only in non-fallback DCI, or fallback DCI or both. The indication can be separate for downlink DCIs and for uplink DCIs.

An example indication table is shown below for the DL. The exact behavior that the UE follows to determine whether it follows same-slot state or cross-slot state is discussed further in the subsequent sections.

| Cross-slot Indicator field (CSIF) | Value |
| --- | --- |
| 0 | Min K0 value configured by higher layers is NOT applicable |
| 1 | Min K0 value configured by higher layers is applicable |

In some cases, DCI 1-0 may not have an explicit CSIF bit, but if UE is operating in same-slot state and receives a DCI 1-0 with TRDA with K0<K0_min, it could be considered as an 'implicit CSIF=0' received in the slot.

Procedure for State Transitions Using CSIF

There are several aspects that may be considered in designing state transitions between same-slot state and cross-slot state. One consideration is that a UE would wish to remain in power savings state (or cross-slot state or assuming only cross-slot scheduling) as much as possible, while transitioning quickly (as early as possible) to non-power savings state (or same-slot state or assuming not "only cross-slot scheduling") and staying in that state for data reception. The discussion below shall be using downlink scheduling case, but it should be clear that the same principles apply for uplink scheduling case.

Figure 1:
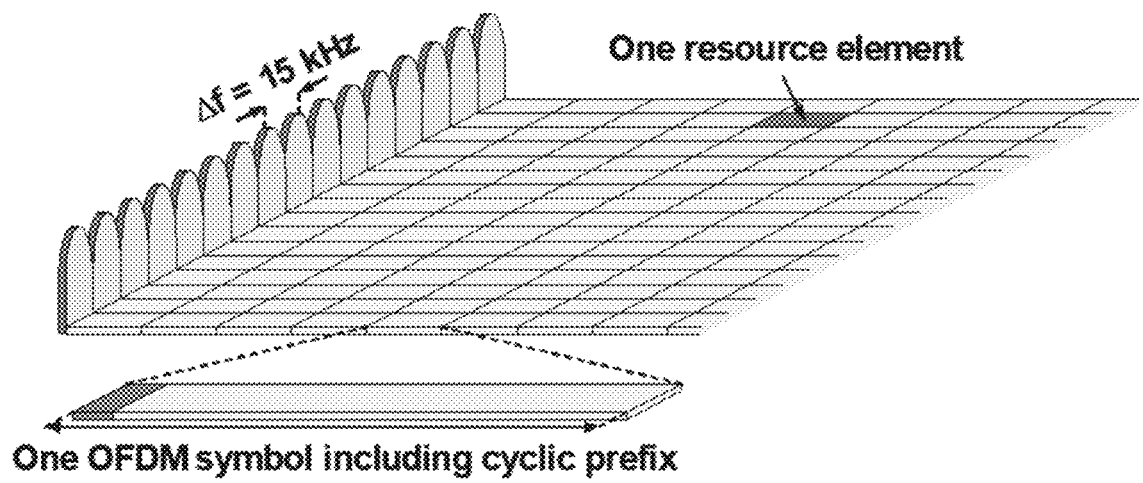
FIG. 1 is an illustration of radio resource elements in NR.
Figure 2:
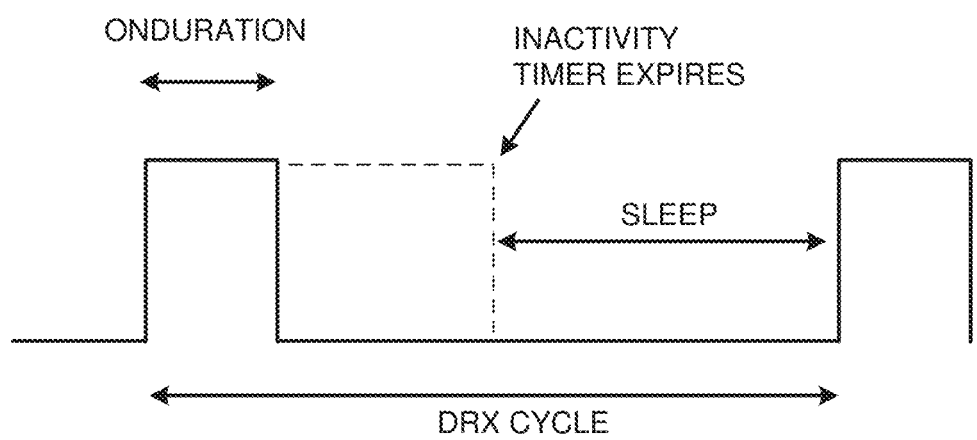
FIG. 2 is an illustration of a simplified DRX operation.
Figure 3:
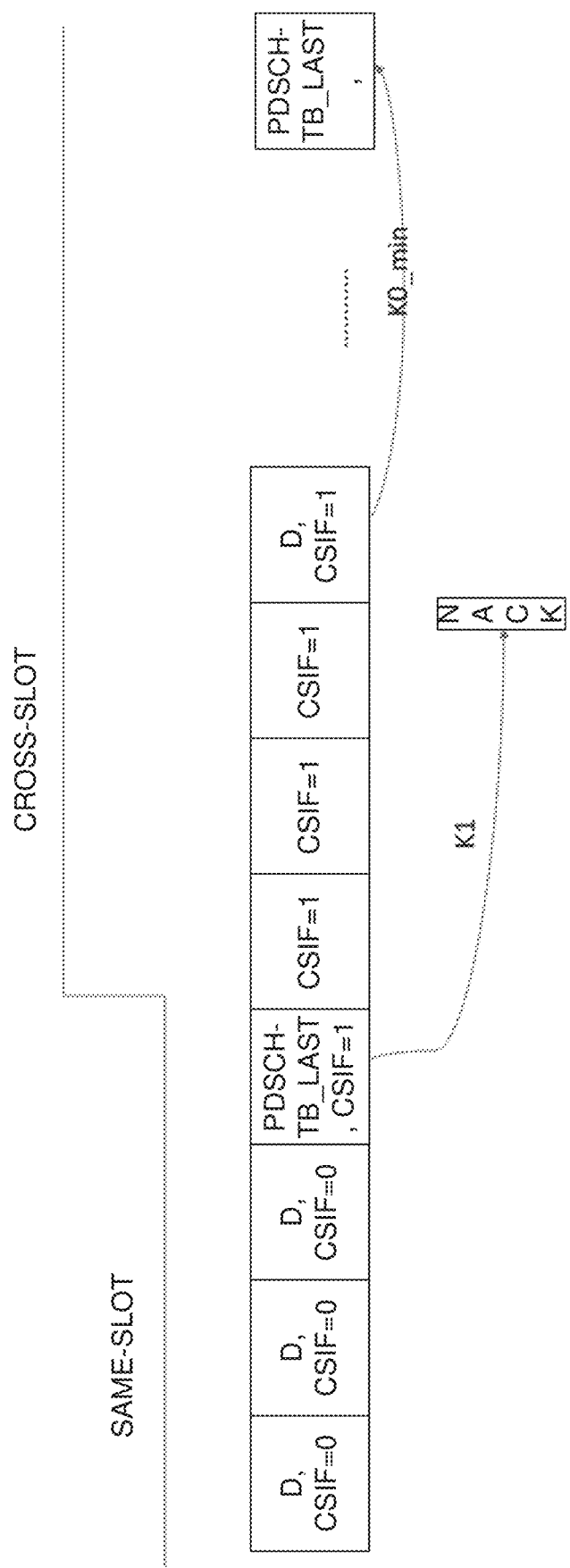
FIG. 3 is an Illustration of excessive delay experienced by last packet when switching does not take HARQ feedback into account.

When the UE is indicated to switch from cross-slot to same-slot, the switching can typically take a minimum of the indicated K0_min slots or more. If the UE is in cross-slot state for saving power in between traffic bursts, then each traffic burst will experience a startup delay of K0_min slots. Same to cross-slot switching can be applied sooner (e.g. within 1 or 2 slots). However, if the last PDSCH (sent along with L1 command switching to cross-slot state from same-slot state) is unsuccessful (UE sends NACK), then the NW would end up scheduling retransmissions for the corresponding data packet with larger delays (since it already indicated the UE to switch to cross-slot). An example is shown in FIG. 3, where the last PDSCH suffers from a delay of K1+K0_min. Avoiding such delays is necessary. This is shown in FIG. 3.

An alternative would be for the gNB to finish the traffic burst successfully (i.e. receive ACK for last packet) and then send a switching command for UE to transition to power savings state—this may require new non-scheduling DCI (or a fake scheduling DCI for a previously successful packet) both of which are unattractive due to additional resource overhead.

Instead, cross-slot state (e.g. UE expects to be scheduled with K0>=K0_min) can be considered as default state, and UE can go to the cross-slot state, remains in cross-slot state or transition to the same-slot state (e.g. UE expects to be scheduled any K0 value) based on conditions as described herein.

Methods for State Transitions Using CSIF

Same-slot scheduling state (SS) for slot n can imply that UE does not expect any restriction on K0 values used for scheduling DCI (e.g. if UE is configured by higher layers with N K0 values that can be used for TDRA allocation, UE may expect any of those N K0 values can be used for scheduling PDSCH).

Cross-slot scheduling state (CS) for slot n can imply that UE is not expected to receive DCI with k0<minK0 in slot n, or alternately UE expects to receive only DCI with k0>=minK0 in slot n (e.g. if UE is configured by higher layers with N K0 values that can be used for TDRA allocation, UE may expect that among those N K0 values, only some N1 K0 values that satisfy a condition (e.g. K0>=K0_min) can be used for scheduling PDSCH).

The UE may receive a higher layer configuration enabling cross-slot scheduling. Before applying the higher layer configuration, the UE monitors DCI assuming only SS. After applying the higher layer configuration, the UE monitors DCI assuming either SS or CS for a slot. The UE assumes SS or CS for a slot (n) based on whether a first or a second value is indicated in a field (CSIF) indicated in DCI format in one or more time windows relative to the slot (n).

Some example detailed methods are provided below.

The following method can be used for determining whether a UE expects to receive DCI with a Time domain resource allocation (TDRA) satisfying the constraint K0<K0_min in slot n, based on the CSIF and other factors.

A first method (Method 1) is that the UE is not expected to receive DCI with k0<minK0 in slot n if:
- if the UE has not detected a DCI with CSIF set to 0 in any slot between slot n-1 and slot n-X; or
- if the UE has detected a DCI with CSIF set to 0 in slot n, but not detected a DCI with CSIF set to 0 in any slot from slot n-Y to slot n-Y-X, or
- if the UE has detected a DCI with CSIF set to 1 in slot n, or
- if the UE has detected a DCI with CSIF set to 1 in any slot from slot n-1 to slot n-Y The above method has multiple conditions and the UE is not expected to receive DCI with K0<K0_min if at least one of the conditions is satisfied.

A first condition is when the UE has not detected a DCI with CSIF set to 0 in any slot between slot n-1 and slot n-X. This can mean that there is no CSIF=0 indication for past X slots.

A second condition is when the UE has detected a DCI with CSIF set to 0 in slot n, but not detected a DCI with CSIF set to 0 in any slot from slot n-Y to slot n-Y-X. The second condition can mean that the UE was not expected to receive a DCI in slot n-Y with K0<K0_min.

A third condition is when the UE has detected a DCI with CSIF set to 1 in slot n. The third condition can mean that CSIF=1 is never used for same-slot scheduling (i.e. K0<K0_min).

A fourth condition is when the UE has detected a DCI with CSIF set to 1 in any slot from slot n-1 to slot n-Y. The fourth condition can mean CSIF=1 was detected in past Y slots.

A generalized method (Method 1'x) can be as follows.

UE is not expected to receive DCI with k0<minK0 in slot n,
- if the UT has not detected a DCI with CSIF set to 0 in a first time window (window1) relative to slot n; or
- if the UE has detected a DCI with CSIF set to 0 in slot n, but not detected a DCI with CSIF set to 0 in any slot in a second time window (window2) relative to slot n, or
- if the UE has detected a DCI with CSIF set to 1 in slot n, or
- if the UE has detected a DCI with CSIF set to 1 in any slot in a third time window (window3) to slot n.

The above method has multiple conditions and the UE is not expected to receive DCI with K0<K0_min if at least one of the conditions is satisfied.

A first condition is when the UE has not detected a DCI with CSIF set to 0 in a first window relative to slot n. The first condition can mean that there is no CSIF=0 indication in a first window relative to slot n, e.g. past X slots.

A second condition is when the UE has detected a DCI with CSIF set to 0 in slot n, but not detected a DCI with CSIF set to 0 in any slot in a second window relative to slot n. The second condition can mean that the UE was not expected to receive a DCI in a slot at the end of the second window with K0<K0_min.

A third conditions is when the UE has detected a DCI with CSIF set to 1 in slot n. The third condition can mean that CSIF=1 is never used for same-slot scheduling (i.e. K0<K0_min).

A fourth condition is when the UE has detected a DCI with CSIF set to 1 in any slot in a third window. The fourth condition can mean CSIF=1 was detected in a third window relative to n, e.g. past Y slots.

The slots can be in the numerology of the scheduling cell. The method can be applied for each (scheduling cell, scheduled cell) pair independently. X and Y can be configured e.g., by higher layers independently for each pair of (scheduling cell, scheduled cell) and on a per-BWP basis.

Figure 4:
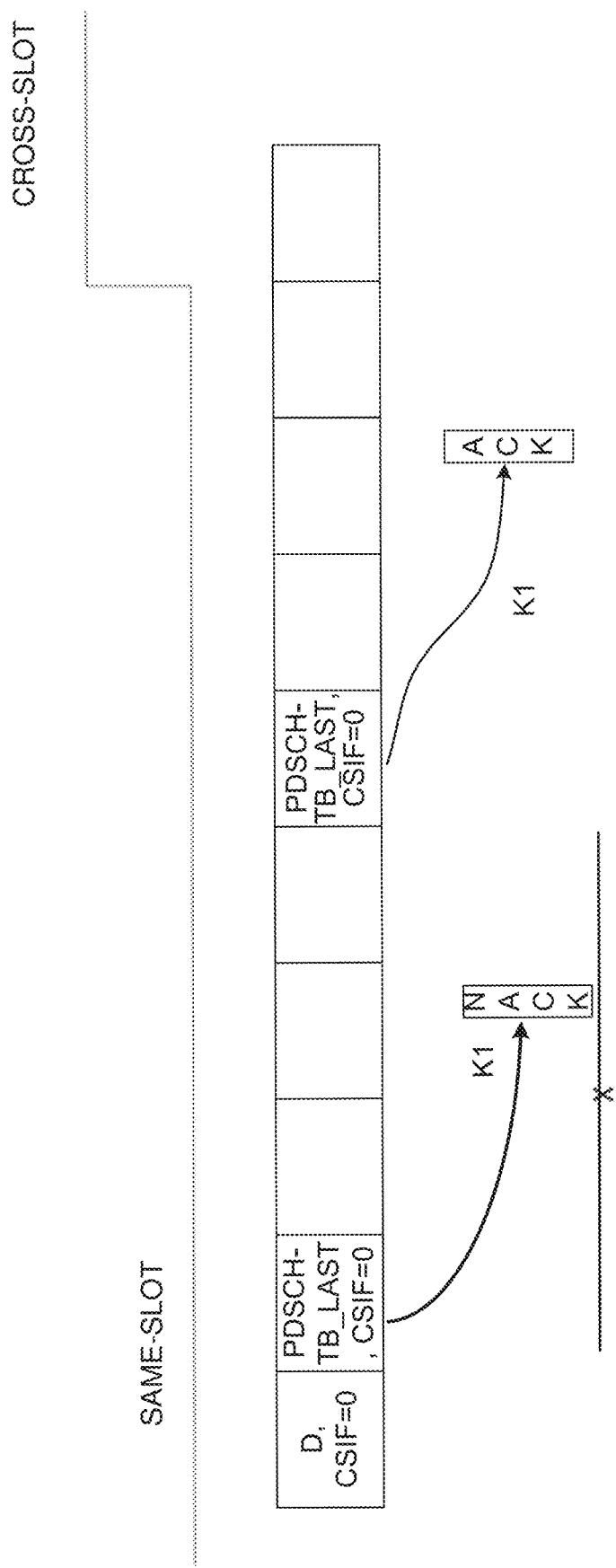
FIG. 4 is an illustration of same-slot to cross-slot switching taking HARQ feedback delay into account.

The value of X enables the gNB signal the UE to switch (more aggressively) from same-slot state to cross-slot state while considering the HARQ feedback delay to avoid unnecessary delays on last packet. For example, if the HARQ feedback for last packet is NACK, the NW can schedule the UE with same-slot state immediately without extra delays due to switching. An example is shown in FIG. 4.

The value of X can be configurable by gNB.

In one example, the HARQ feedback delay may be K1=4 slots. Then, the NW may set value of X to be 6, accounting for HARQ feedback delay of 4 slots and approximately one slot for HARQ feedback decoding delay. Thus, by setting X=6, the NW can be able to continue scheduling the UE with same-slot in case of receiving NACK on PDSCH For a given slot-n, the UE does not expect to receive DCI with K0<K0_min if the UE has detected a DCI with CSIF set to 1 in slot n or in any of the past Y slots.

Generally, Y can be linked to K0_min, to reflect the switching delay (or application time) needed for cross-slot state to same-slot state switching. Y can also be configured by higher layers. Translation may be supported in case of cross-carrier scheduling with mixed numerologies which is discussed further in see 5.1.3.

In one example K0_min can be 4 slots. X or Y can be set to 4. X or Y can be configured by higher layers to be 8 slots.

In another example, K0_min can be 4 slots, X or Y can be configured by higher layers to be 8 slots.

Values of X, Y can be configurable by higher layers.

One or more of below principles can also be applied or implied by the methods described above.
1) DCI with CSIF=1 is not used for scheduling K0<K0_min.
2) Only DCI with CSIF=0 is used for scheduling K0<K0_min.
3) If UE is cross-slot state in slot-(m−1) and gets DCI with CSIF=0 in slot m, it should be prepared to receive K0<K0_min in slot m+Y unless some other DCIs are received in between m and m+Y and that can indicate some different information (related to CSIF).
4) If UE gets DCI with CSIF=1 in slot m, it should not expect K0<K0_min until slot m+Y. Other DCIs may be received in between but do not impact the cross-slot state based reception in slot m+Y.
5) If UE is in cross-slot state in slot n−Y, it should not expect DCI with K0<K0_min until slot n. Other DCIs can come in between but do not impact slot m+Y.

A third method (Method 3) can be as follows.

UE is not expected to receive DCI with k0<minK0 in slot n,
  if the UE has detected a DCI with CSIF set to 0 in slot n, but not detected a DCI with CSIF set to 0 in any slot from slot n−Y to slot n−Y−X,
  if the UE has detected a DCI with CSIF set to 1 in slot n,
  if the UE has detected a DCI with CSIF set to 1 in any slot from slot n−1 to slot n−Y For this method, the state transition based on time X may be simplified.

While the embodiments are described using downlink, the same principles apply to uplink scheduling, where e.g. instead of HARQ feedback reception, X can be configured to allow PUSCH transmission and decoding time at the gNB.

Figure 5:
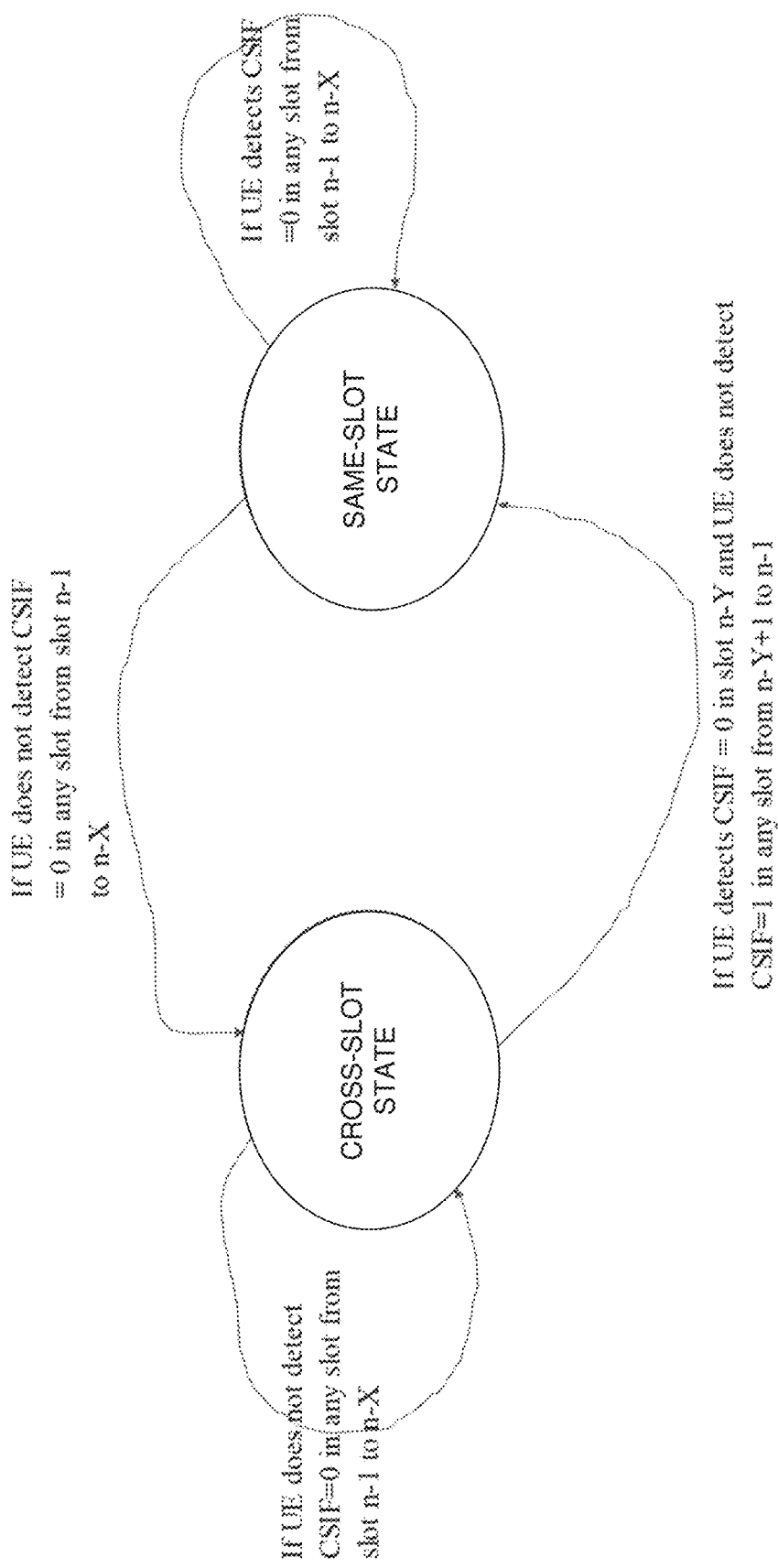
FIG. 5 is a signaling illustration of state transitions from slot-n−1 to slot-n in accordance with some embodiments of inventive concepts.

An example state diagram is shown in FIG. 5.

For simplicity WUS is not shown in the figure. The state diagram shown is based on Method 1′b described below.

These state diagram also be considered as an independent state machine for operating UE in cross-slot state or same-slot state, based on a state machine.

A first state transition procedure can be as follows, consider Y=K0_min (or minK0):
  Method 1′a Cross-to-same slot switching i.e. 'Assuming cross-slot in n−1, UE assumes same-slot in n'
  If UE detects CSIF=0 in slot n-minK0 and UE does not detect 1 in any slot from n-minK0+1 to n−1
Same-to-same slot i.e. 'Assuming same-slot in n−1, UE assumes same-slot in n'
  If UE detects CSIF=0 in any slot from slot n−1 to n−X
Cross-to-Cross slot i.e. 'Assuming cross-slot in n−1, UE assumes cross-slot in n'
  If UE does not detect CSIF=0 in any slot from slot n−1 to n−X
Same-to-cross slot i.e. 'Assuming same-slot in n−1, UE assumes cross-slot in n'
  If UE does not detect CSIF=0 in any slot from slot n−1 to n−X A second state transition procedure can be as follows, considering X and Y (Method 1′b).

Method 1′b
Cross-to-same slot switching i.e. 'Assuming cross-slot in n−1, UE assumes same-slot in n'
  If UE detects CSIF=0 in slot n−Y and UE does not detect CSIF=1 in any slot from n−Y+1 to n−1
Same-to-same slot i.e. 'Assuming same-slot in n−1, UE assumes same-slot in n'
  If UE detects CSIF=0 in any slot from slot n−1 to n−X
Cross-to-Cross slot i.e. 'Assuming cross-slot in n−1, UE assumes cross-slot in n'
  If UE does not detect CSIF=0: in any slot from slot n−1 to n−X
Same-to-cross slot i.e. 'Assuming same-slot in n−1, UE assumes cross-slot in n'
  If UE does not detect CSIF=0 in any slot from slot n−1 to n−X Additional possible methods for state transitions using CSIF An alternate method can also be described. This can be based on the last received DCI. In this case, it may be possible to schedule a UE in same-slot state using CSIF=1. The interpretation of the CSIF field can be different than other methods such as in Method 1. In this case the state transitions from cross-slot state to same-slot state and vice versa can be considered application delays. A value Y may be the application delay from cross-slot state to same slot state. A value X may be the application delay from same-slot state to cross-slot state.

Same-slot state (SS) for slot n can imply that UE does not expect any restriction on K0 values used for scheduling DCI (e.g. if UE is configured by higher layers with N K0 values that can be used for TDRA allocation, UE may expect any of those K0 values can be used for scheduling PDSCH)

Cross-slot state (CS) for slot n can imply that UE is not expected to receive DCI with k0<minK0 in slot n, or alternately UE expects to receive only DCI with k0>=minK0 in slot n (e.g. if UE is configured by higher layers with N K0 values that can be used for TDRA allocation, UE may expect that among those N K0 values, only those K0 values that satisfy a condition (e.g. K0>=K0_min) can be used for scheduling PDSCH).

The method can be described as follows (Method 4):
Method 4
If last received CSIF=1 and CSIF=0 received in slot n, UE switches from cross-slot state to same-slot state in slot n+Y,
For application delay slots, i.e., slots n to n+Y−1 UE assumes cross-slot state regardless of CSIF indicated
If last received CSIF=0 and CSIF=1 received in slot n, UE switches from SS to CS in slot n+X For application delay slots, i.e., slots n to n+X−1 UE assumes SS regardless of CSIF If last received CSIF=1 and nothing detected in slot n UE assumes CS for slot n (not valid for slots during application delay)

If last received CSIF=0 and nothing detected in slot n

UE assumes SS in slot n (not valid for slots during application delay)

In one example K0_min can be 4 slots. X or Y can be set to 4. X or Y can be configured by higher layers to be 8 slots.

In another example, K0_min can be 4 slots, X or Y can be configured by higher layers to be 8 slots.

Values of X, Y can be configurable by higher layers.

Additional conditions can be added to improve above method.

Initial state can be defined, i.e. on configuration of the CSIF field, the UE can be in a pre-determined state (e.g. cross-slot state) or the UE may be configured to be in one of the same-slot state or cross-slot state.

Default state(s) can also be pre-defined or configured e.g. at beginning of OnDuration timer, activation of a cell, after BWP switching, after switching an Scell to operate with dormancy-like behavior, detection of WUS, etc.

Including BWP Switching

The CSIF bit is configurable on a per BWP basis. The values of X, Y, Z, minimum K0 and K2 can also be configured on a per-BWP basis.

The method can be applied to within an active BWP. In case of BWP switching, some transition methods can be specified to ensure the UE knows whether to expect the min K0 restriction or not in the new BWP.

An example can be as follows (both BWP1 and BWP2 have the CSIF field):

In first example, if the UE does not receive a DCI with CSIF in the first slot after BWP switch, for the purpose of determining state (whether same-slot state or cross-slot state), the UE assumes it has detected a DCI with CSIF in the first slot is set to the same value as the CSIF in the BWP switching command.

In another example, the UE may assume that it has detected a DCI with CSIF in the first slot set to a pre-configured or pre-determined value. For example, if the BWP is mainly used for power savings, the pre-configured value may be 1, while if the BWP is mainly used for scheduling data traffic the pre-configured value may be 0.

If BWP1 has CSIF and BWP2 has no CSIF, then the UE may assume there is no min K0 restriction after switching to BWP2 from BWP1.

In case of cross-carrier with mixed numerology, need to indicate K0/K2 value per (scheduling scalable sub-carrier spacing (SCS), scheduled SCS pair).

X is based on the active BWP for the slot-n and can be in numerology of the scheduling cell for the active BWP.

Carry-over the state indicated in the previous DCI for BWP switching

Start new BWP with cross-slot state

The state machine can operate within a BWP, and resets at the time of BWP switching? i.e. in the first slot after BWP switch, UE starts with a pre-defined state (e.g. same-slot state) or a configured mode.

BWP switching and cross-slot state switching need to be consistent. i.e. if UE is taking advantage of min K0 restriction to process DCI reception, etc. in a more relaxed fashion, the BWP switching command should ensure that the advantage in relaxed processing is not lost. Therefore, while UE is in cross-slot state active BWP and BWP switching command is received, the UE should be able to switch and start receiving the corresponding PDSCH/PUSCH while satisfying a delay value (e.g. application delay) corresponding to the cross-slot transition of the BWP before switching.

If CSIF bit is set 1 and a BWP switch command is sent, then the UE is not required to receive with k0<min k0 in the new BWP, until the first slot that starts at or after the min k0 corresponding to the (scheduling cell SCS, scheduled cell SCS) in the switching command.

Including WUS

An example combining the method with WUS is shown below.

If UE is further configured with WUS, the method in method 1 can be updated to also reflect the WUS as follows:

Method 1 with WUS

UE is not expected to receive DCI with k0<minK0 in slot n, (if the UE has not detected a DCI with CSIF set to 0 in any slot between slot n−1 and slot n−X and if the UE has not detected a WUS with wakeup indication in any slot between slot n−1 and slot n−Z); or if the UE has detected a DCI with CSIF set to 0 in slot n. (but not detected a DCI with CSIF set to 0 in any slot from slot n−Y to slot n−Y−X and not detected a WUS with wakeup indication in any slot between slot n−1 and slot n−Z), or if the UE has detected a DCI with CSIF set to 1 in slot n, or if the UE has detected a DCI with CSIF set to 1 in any slot from slot n−1 to slot n−Y The above scheme can also handle the joint Cross-slot and WUS operation if the UE is configured with both power savings scheme.

When WUS is detected for the UE, the UE should be ready to start receiving using same-slot state at the beginning of the corresponding On duration. To reflect this, a variable Z can be introduced such that for a given slot-n, the UE does not expect to receive DCI with K0<K0_min if the UE has not detected a same slot indicator in past X slots or a WUS in any of the past Z slots. Z can reflect the WUS offset and additional offset value to cover the On duration.

Figure 6:
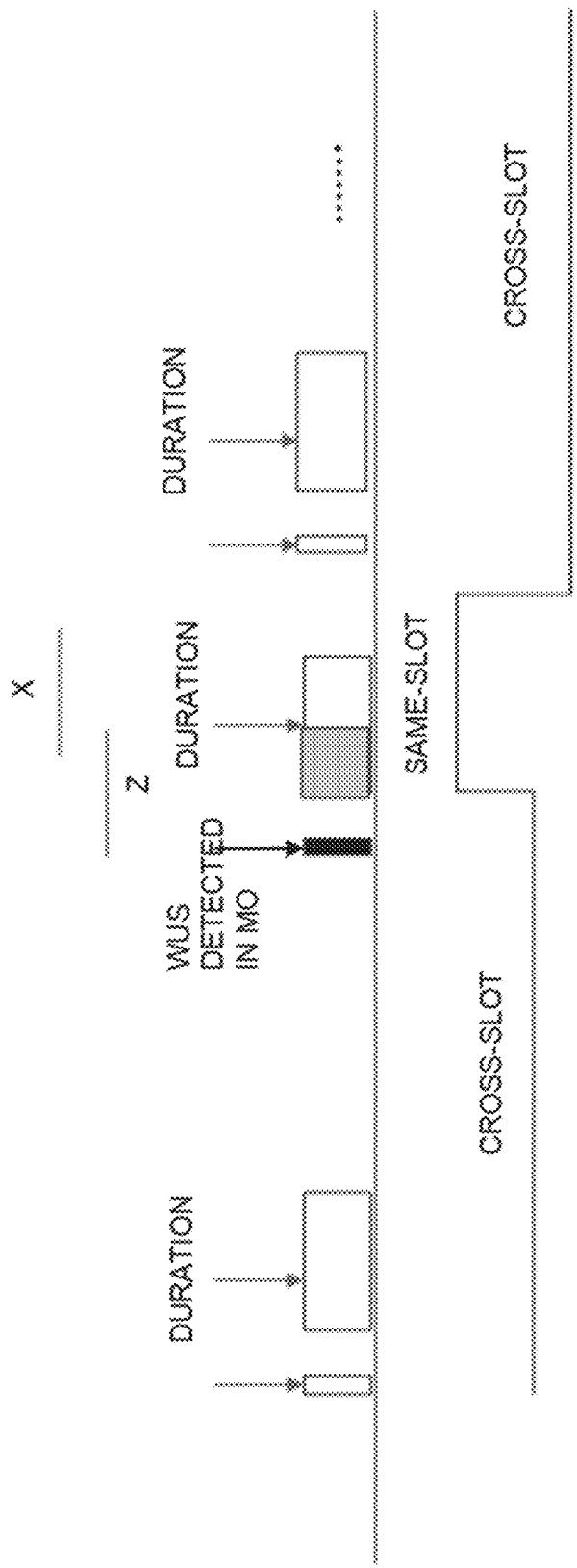
FIG. 6 is an illustration of Cross-slot scheduling and wake up signal (WUS) Interaction.

An example of the above scheme is shown in FIG. 6.

In case of mixed numerology, for a serving cell, the last slot overlapping the slot in which WUS is received can be considered as slot in which WUS is received in reference to Z.

Z can be configurable and can be configured for each scheduled serving cell independently. Z can be expressed in the numerology of the scheduling cell.

In another embodiment, the CSIF field may be more than 1 bit. For example, using more than 1 bit may be used in the case when more than one min applicable values are configured by higher layers. For example, the network may configure K0_min1=4, and K0_min2=16, and use a 2-bit CSIF field.

| Cross-slot Indicator field (CSIF) | Value |
|---|---|
| 00 | Min K0 values configured by higher layers is NOT applicable |
| 01 | K0_min1 is applicable |
| 10 | K0_min2 is applicable |
| 11 | reserved |

The states can be defined as follows:

S—same-slot state, M—medium K0 cross-slot state, and L—Large K0 cross-slot state A method may be defined for the transitions between the defined states. For example, L to S and L to M may take $Y_L$ slots (e.g. K0_min2). M to S may take $Y_M$ slots (e.g. Ko_min1). For the reverse delays, S to L and M to L may take X slots. In some embodiments, the X slots for S to L may be defined separately from the X slots for M to L. For example, the S to L transition may take $X_{SL}$ slots and the M to L transition may take $X_{ML}$ slots.

The method described below describes at least a partial set of rules based on which UE is not expected to receive DCI with k0<K0_min1 or k0<K0_min2

The UE is not expected to receive DCI with k0<K0_min1 in slot n,
  if the UE has detected a DCI with CSIF set to 0 in slot n, but not detected a DCI with CSIF set to 0 in any slot from slot n−Y to slot n−Y−X, or
  if the UE has detected a DCI with CSIF set to 01 in slot n, or
  if the UE has detected a DCI with CSIF set to 01 in any slot from slot n−1 to slot n−Y The UE is not expected to receive DCI with k0<K0_min2 in slot n,
  if the UE has not detected a DCI with CSIF set to 00 in any slot between slot n−1 and slot n−X; or
  if the UE has not detected a DCI with CSIF set to 01 in any slot between slot n−1 and slot n−X; or
  if the UE has detected a DCI with CSIF set to 10 in slot n, or
  if the UE has detected a DCI with CSIF set to 10 in any slot from slot n−1 to slot n−YL
  if the UE has detected a DCI with CSIF set to 00 in slot n, but not detected a DCI with CSIF set to 00 or 01 in any slot from slot n−Y L to slot n−YL−X With cross-slot scheduling, the minimum processing time for PDCCH can be relaxed in some cases. For example, if both UL and DL scheduling DCI have minimum K2, K0 values respectively, then the PDCCH end to start of uplink transmission can be predictably larger, providing UE with relaxed processing time for PDCCH, which results in saving power. This relaxed processing time can however be upended when some other processing requirement becomes stringent, e.g. DL SPS release, which is a DCI message that releases PDSCH, but has no associated data transmission, and thus requires a HARQ ACK to be sent 1 slots later.

A UE may be expected to provide HARQ-ACK information in response to a SPS PDSCH release after N symbols from the last symbol of a PDCCH providing the SPS PDSCH release. For UE processing capability 1 [6, TS 38.214] and for the SCS of the PDCCH reception, 10=N for 15 kHz, 12=N for 30 kHz, 22=N for 60 kHz, and 25=N for 120 kHz. For a UE with capability 2 [6, TS 38.214] in FR1 and for the SCS of the PDCCH reception, 5=N for 15 kHz, 5.5=N for 30 kHz, and 11=N for 60 kHz.

If the UE is in cross-slot mode (e.g. for UL and DL), the DL SPS release processing can be relaxed e.g. the time between PDCCH end to SPS release ACK can be minimum of K2-min and K0_min+N symbols (or K1).

If the UE is in cross-slot mode DL, the DL SPS release processing may also be relaxed e.g. the time between PDCCH end to SPS release ACK can be K0_min+K1.

When the UE operates in cross-slot state and receives a DL SPS release, the UE can assume a relaxed processing time for DL SPS release feedback transmission. When the UE operates in not cross-slot state (e.g., in a same-slot state) and receives a DL SPS release, the UE can assume a second processing time (not relaxed) for DL SPS release feedback transmission.

If the UE is in cross-slot mode for only UL, the DL SPS release processing should also be relaxed so that the time between PDCCH end to SPS release ACK is at least as large as the time between PDCCH end and cross-slot uplink scheduling.

The DL DCI can be used to enable/disable K2 also and vice versa. This may allow the UE to quickly move from power-savings state to non-power savings state. Thus having to simultaneously switch K0 and K2 using a single DCI can be beneficial. Note that UL K2 adaptation may not even be necessary if min K2 value is 1 or larger, which may often be the case.

Figure 7:
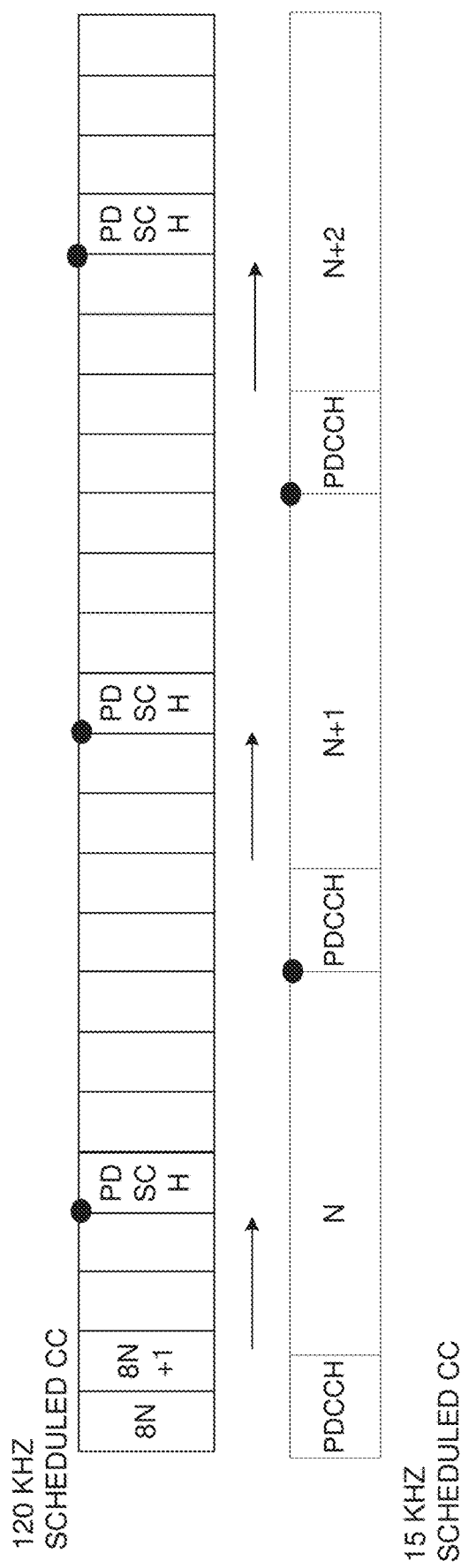
FIG. 7 is an illustration of minimum separation between end of PDCCH and start of corresponding PDSCH.

Independent control of K0 and K2 can be done. Alternatively, joint control of K0 and K2 may be done. Some of the ways that the DL DCI and UL DCI can be used to control K0 and K2 include:
  DL DCI controls K0 only (i.e. DL cross-slot state or not)
  UL DCI controls K2 only (i.e. UL cross-slot state or not)
  DL DCI controls K0 and K2 (i.e. DL/UL cross-slot state or not). X, Y can be same or different for DL and UL
  UL DCI controls K0 and K2 (i.e. DL/UL cross-slot state or not). X, Y can be same or different for DL and UL
  DL and UL DCI control both K0 and K2 (i.e. DL/UL cross-slot state or not). X, Y can be same or different for DL and UL Mixed Numerology Considerations The following scheduling cases should be supported
Self-scheduling
Cross-carrier scheduling with scheduling and scheduled CC with same numerology
Cross-carrier scheduling with scheduling and scheduled CC with different numerology
  Scheduling CC SCS<Scheduled CC SCS
  Scheduling CC SCS>Scheduled CC SCS For cross-carrier scheduling with mixed numerology, as per the Rel-16 agreement in MR-DC, there is a minimum separation between end of PDCCH and start of corresponding PDSCH. FIG. 7 illustrates a 15 kHZ SCS scheduling carrier and a 120 kHz scheduling carrier and corresponding min separation. Roughly, the separation leads to an inherent min K0 value of 4 slots for 15 kHz ctrl scheduling 120 kHz data.

Figure 8:
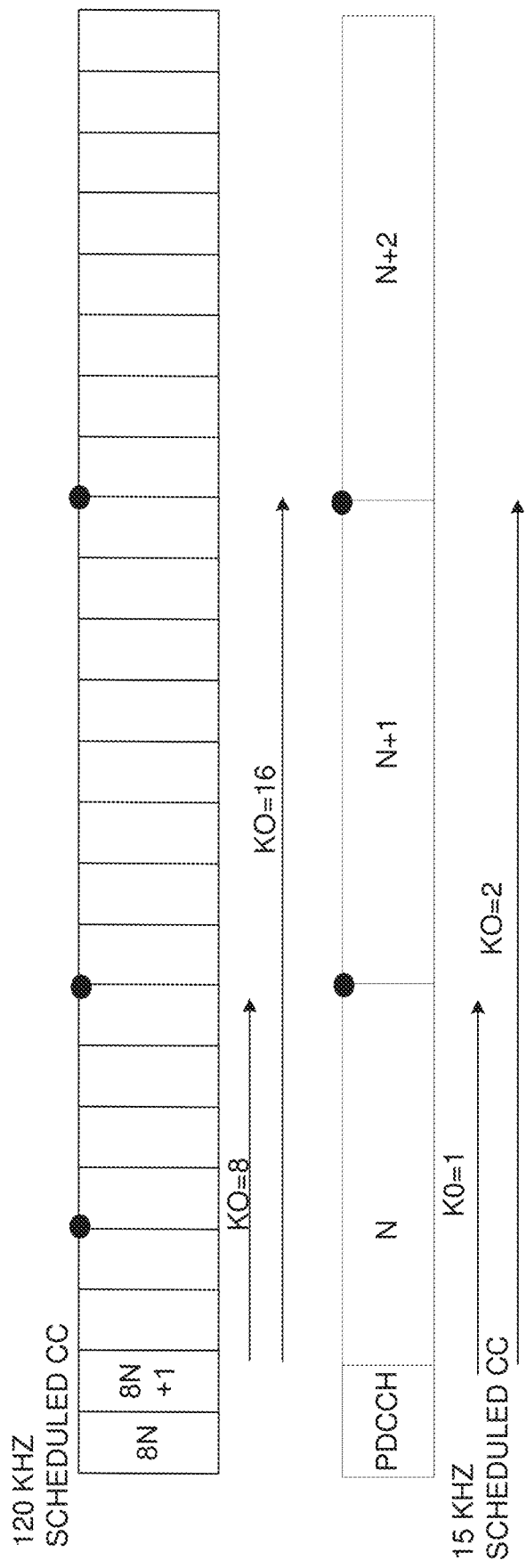
FIG. 8 is an illustration of cross-slot and cross-carrier scheduling with mixed numerologies in accordance with some embodiments of inventive concepts.

An example with "cross-slot" and cross-carrier between different numerologies is shown in FIG. 8. In this case a scheduling CC with 15 kHz can apply minimum K0 of 1 or 2 for self-scheduling case, and a min K0 of 8 or 16 for cross-carrier scheduling case and save power with associated microsleep durations on scheduling and scheduled cells.

In case specific values are necessitated, then X or Y can be determined as follows considering cross-carrier scheduling with mixed, where the minimum K0 value (in numerology of scheduled cell) is translated to a corresponding slot in numerology of scheduling cell using the respective numerologies. X or Y can take one of the following value:

$$\left\lceil K0\_\min \cdot \frac{2^{\mu_{PDCCH}}}{2^{\mu_{PDSCH}}} \right\rceil \text{ or } \left\lfloor K0\_\min \cdot \frac{2^{\mu_{PDCCH}}}{2^{\mu_{PDSCH}}} \right\rfloor + 1$$

There can be a possibility that a minimum applicable value could coincide with a scheduling PDCCH slot. For an example of scheduling PDCCH numerology of 15 kHz and scheduled PDSCH of 60 kHz. If the minimum applicable value is to be switched from 4 to 0, then the a "ceil" can imply the PDSCH slot for the new minimum applicable value can start from the PDSCH slot of 4 and it will coincide with the PDSCH slot of the old minimum applicable value, which may lead to causality issue. Therefore, one option is to define X or Y to take the following value:

$$\left\lceil K0\_\min \cdot \frac{2^{\mu PDCCH}}{2^{\mu PDSCH}} \right\rceil + 1 \text{ or } \left\lfloor K0\_\min \cdot \frac{2^{\mu PDCCH}}{2^{\mu PDSCH}} \right\rfloor + 1$$

Another option is to apply a minimum value such as min $$\left( \left\lceil K0\_\min \cdot \frac{2^{\mu PDCCH}}{2^{\mu PDSCH}} \right\rceil, A \right)$$

where A is a configured value.

Operations of the wireless device 900 (implemented using the structure of the block diagram of FIG. 9) will now be discussed with reference to the flow chart of FIG. 11 according to some embodiments of inventive concepts. For example, modules may be stored in memory 905 of FIG. 9, and these modules may provide instructions so that when the instructions of a module are executed by respective wireless device processing circuitry 903, processing circuitry 903 performs respective operations of the flow chart.

Figure 11:
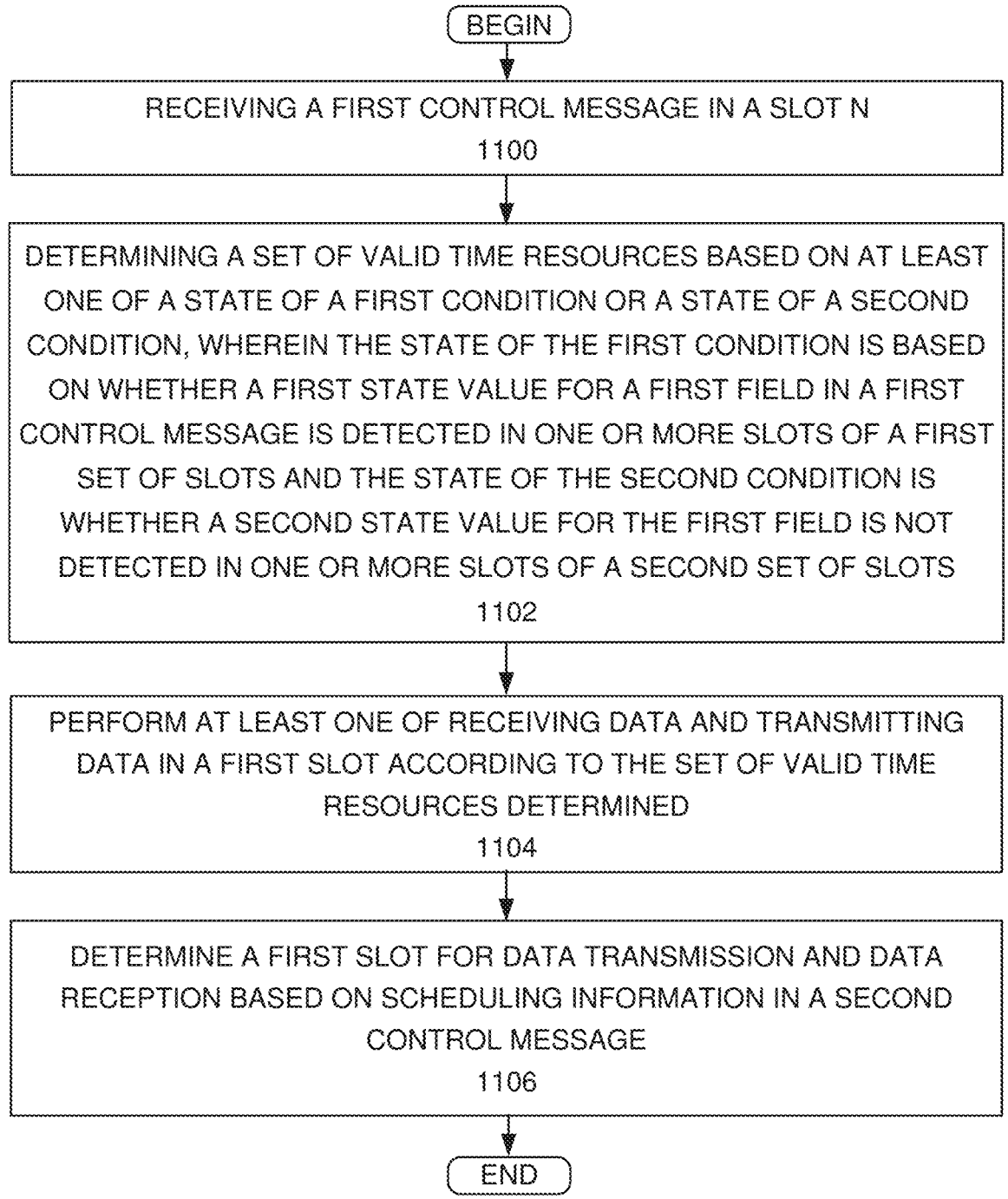
FIGS. 11-12 are flow charts operations of a UE according to some embodiments of inventive concepts.

Turning to FIG. 11, in operation 1100, the processing circuitry 903 may receive, via transceiver 901, a first control message in a slot n. In operation 1102 the processing circuitry 903 may determine a set of valid time resources based on at least one of a state of a first condition or a state of a second condition, wherein the state of the first condition is based on whether a first state value for a first field in the first control message is detected in one or more slots of a first set of slots and the state of the second condition is whether a second state value for the first field is not detected in one or more slots of a second set of slots.

The first control message in some embodiments may be a physical downlink control channel, PDCCH, message assigning downlink resources with DCI format 1-0 or 1-1. The first control message is other embodiments may be a physical uplink control channel, PUCCH, message assigning uplink resources with DCI format 0-0 or 0-1.

The first set of slots in an embodiment may be a first number of slots before slot n, and the first number of slots may be obtained from a higher layer configuration. The second set of slots may be a second number of slots before slot n. The second number of slots may be obtained from a higher layer configuration.

The set of valid time resources may be a first set of time resources responsive to the first state value being detected or the second state value not being detected. The first set of time resources may be time resources with TDRA slot indicator values greater than or equal to a threshold value.

The set of valid time resources may be a second set of time resources responsive to the first state value not being detected or the second state value being detected. The second set of time resources may be time resources with TDRA slot indicator values less than the threshold value.

In some embodiments of inventive concepts, the set of valid time resources may be based on whether a second state value for the first field is not detected in any slot in the second number of slots in a third set of slots and whether a second state value for the first field is detected in a slot subsequent to the second number of slots in the third set of slots.

In embodiments where the UE is configured with a wakeup signal (WUS), the set of valid time resources being further based on whether the WUS is not detected in one or more slots of a third set of slots with a number of the third set of slots configured by higher layers.

The first number of slots and/or the second number of slots may be determined from the threshold value.

In some embodiments of inventive concepts, the second slot is at least a number P of slots before the first slot wherein the number P is a second threshold value. In other embodiments, the second slot is within the number P of slots of the first slot. In yet other embodiments, the first slot and the second slot are the same slot.

In operation 1104, the processing circuitry 903 may perform at least one of receiving, via transceiver circuitry 901, data and transmitting, via transceiver circuitry 901, data in a first slot according to the set of valid time resources determined.

In operation 1106, the processing circuitry may determine a first slot for data transmission and data reception based on scheduling information from a second control message in a second slot and wherein the first slot is a slot in the set of valid time resources. In some embodiments the first control message and the second control message are the same messages.

In other embodiments, the state of the first condition may be further based on whether the first state value for the first field in the first control message is detected in the one or more slots of the first set of slots in a first time window and the state of the second condition is further based on whether the second state value for the first field is not detected in the one or more slots of the second set of slots in a second time window.

Various operations from the flow chart of FIG. 11 may be optional with respect to some embodiments of wireless devices and related methods. Regarding methods of example embodiment 1 (set forth below), for example, operations of blocks 1100 and 1106 of FIG. 11 may be optional.

Operations of the wireless device 900 (implemented using the structure of the block diagram of FIG. 9) will now be discussed with reference to the flow chart of FIG. 12 according to some embodiments of inventive concepts. For example, modules may be stored in memory 905 of FIG. 9, and these modules may provide instructions so that when the instructions of a module are executed by respective wireless device processing circuitry 903, processing circuitry 903 performs respective operations of the flow chart of FIG. 12.

Figure 12:
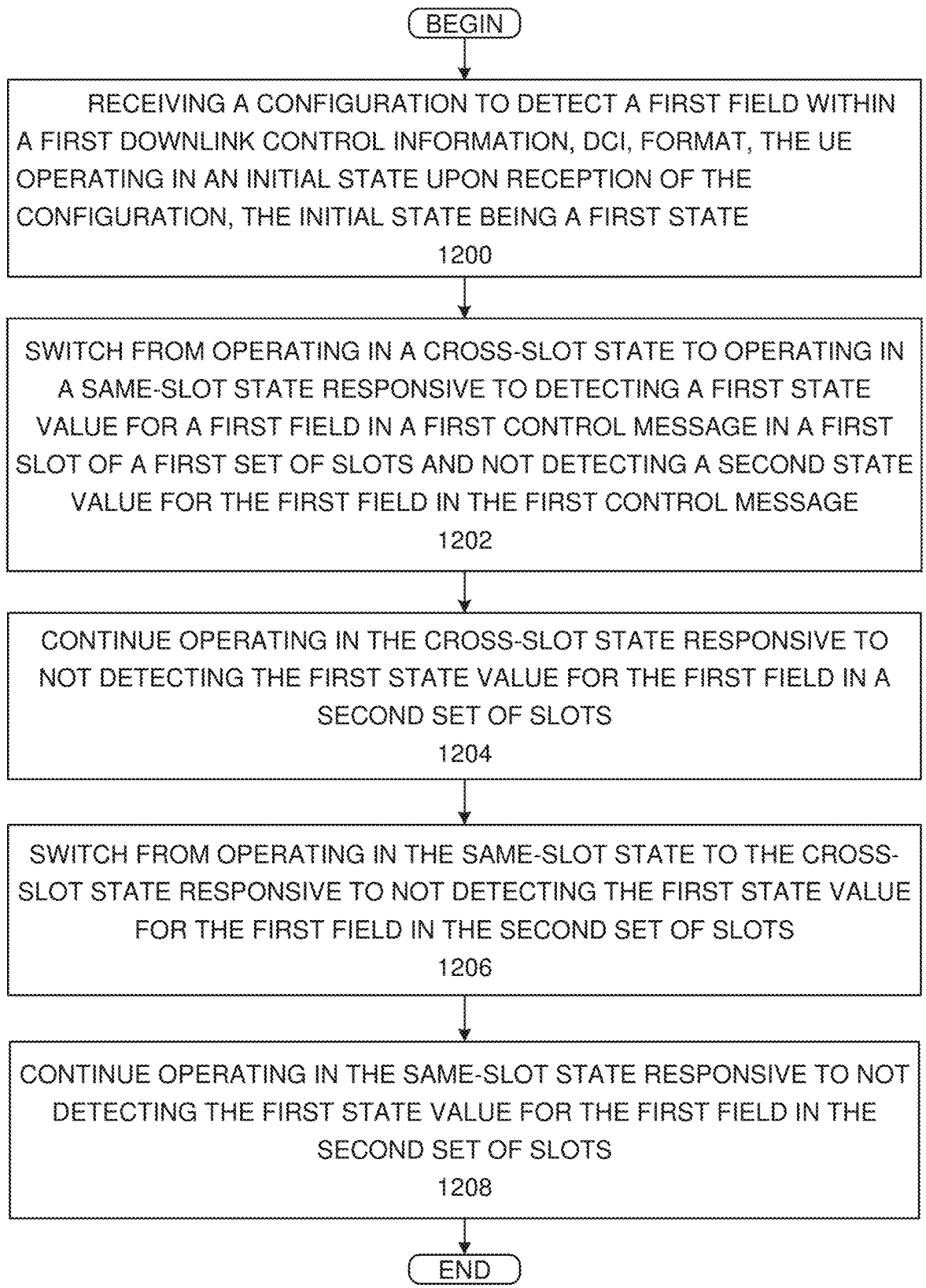

Turning to FIG. 12, while the UE is operating in a cross-slot state, the processing circuitry 903 may in operation 1200 switch from operating in the cross-slot state to operating in a same-slot state responsive to detecting a first state value for a first field in a first control message in a first slot of a first set of slots and not detecting a second state value for the first field in the first control message. In operation 1202, the processing circuitry 903 may continue operating in the cross-slot state responsive to not detecting the first state value for the first field in a second set of slots.

While the UE is operating in the same-slot state, the processing circuitry 903 may switch in operation 1204 from operating in the same-slot state to the cross-slot state responsive to not detecting the first state value for the first field in the second set of slots. In operation 1206, the processing circuitry 903 may continue operating in the same-slot state responsive to not detecting the first state value for the first field in the second set of slots.

Figure 13:
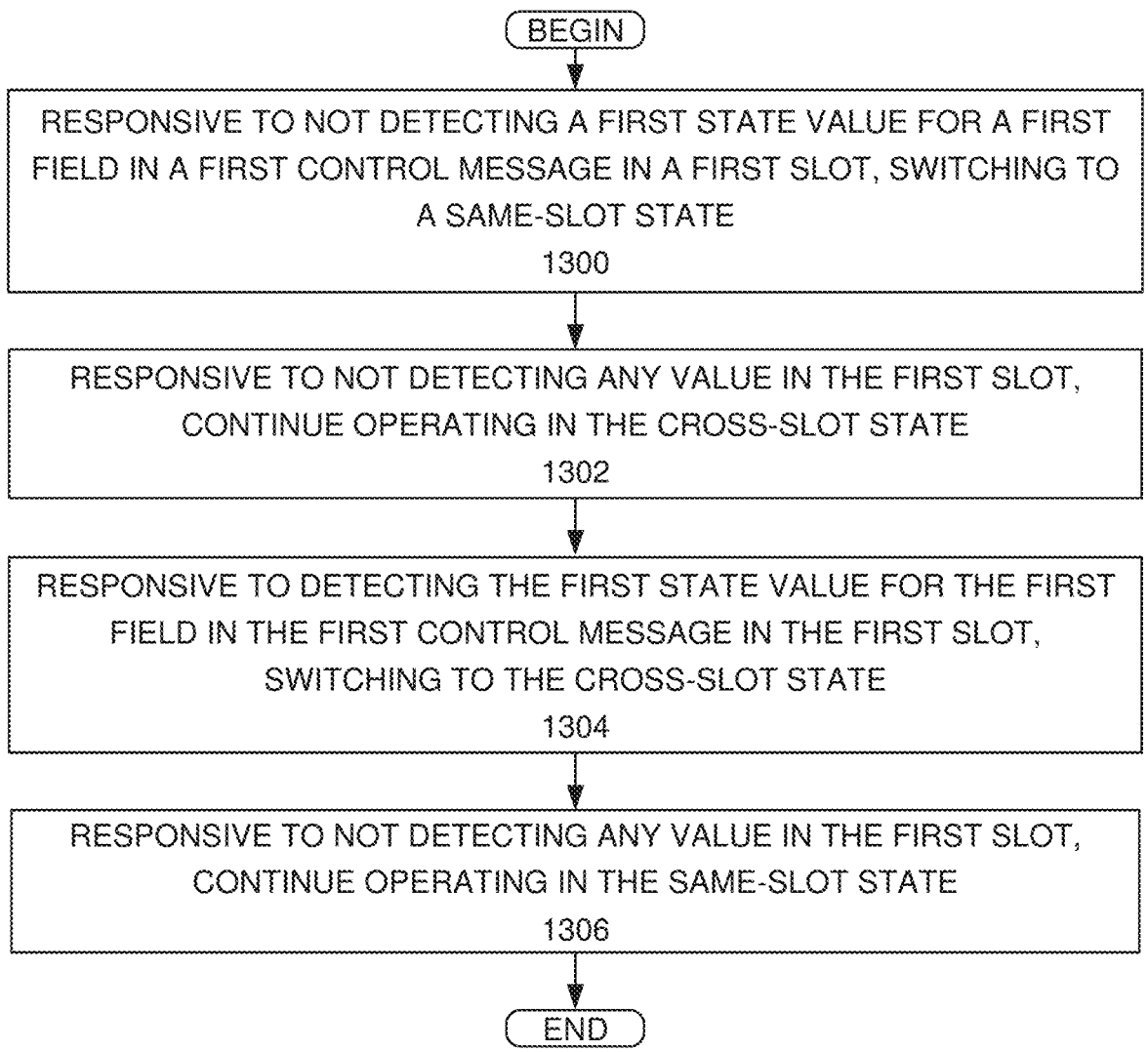
FIG. 13 is a flow chart illustrating operations of a RAN node according to some embodiments of inventive concepts.

FIG. 13 is a flow chart of another embodiment of switching states. Turning to FIG. 13, while the UE is operating in a cross-slot state, the processing circuitry 903 may in operation 1400, responsive to not detecting a first state value for a first field in a first control message in a first slot, switch to a same-slot state. Responsive to not detecting any value in the first slot, in operation 1302, the processing circuitry 903 may continue operating in the cross-slot state.

While the UE is operating in the same-slot state, the processing circuitry 903 may in operation 1304, responsive to not detecting a first state value for a first field in a first control message in a first slot, switch to a same-slot state. In operation 1306, responsive to not detecting any value in the first slot, the processing circuitry 903 may continue operating in the same-slot state.

Operations of a RAN node 1000 (implemented using the structure of FIG. 10) will now be discussed with reference to the flow chart of FIG. 14 according to some embodiments of inventive concepts. For example, modules may be stored in memory 1005 of FIG. 10, and these modules may provide instructions so that when the instructions of a module are executed by respective RAN node processing circuitry 1003, processing circuitry 1003 performs respective operations of the flow chart of FIG. 14.

Figure 14:
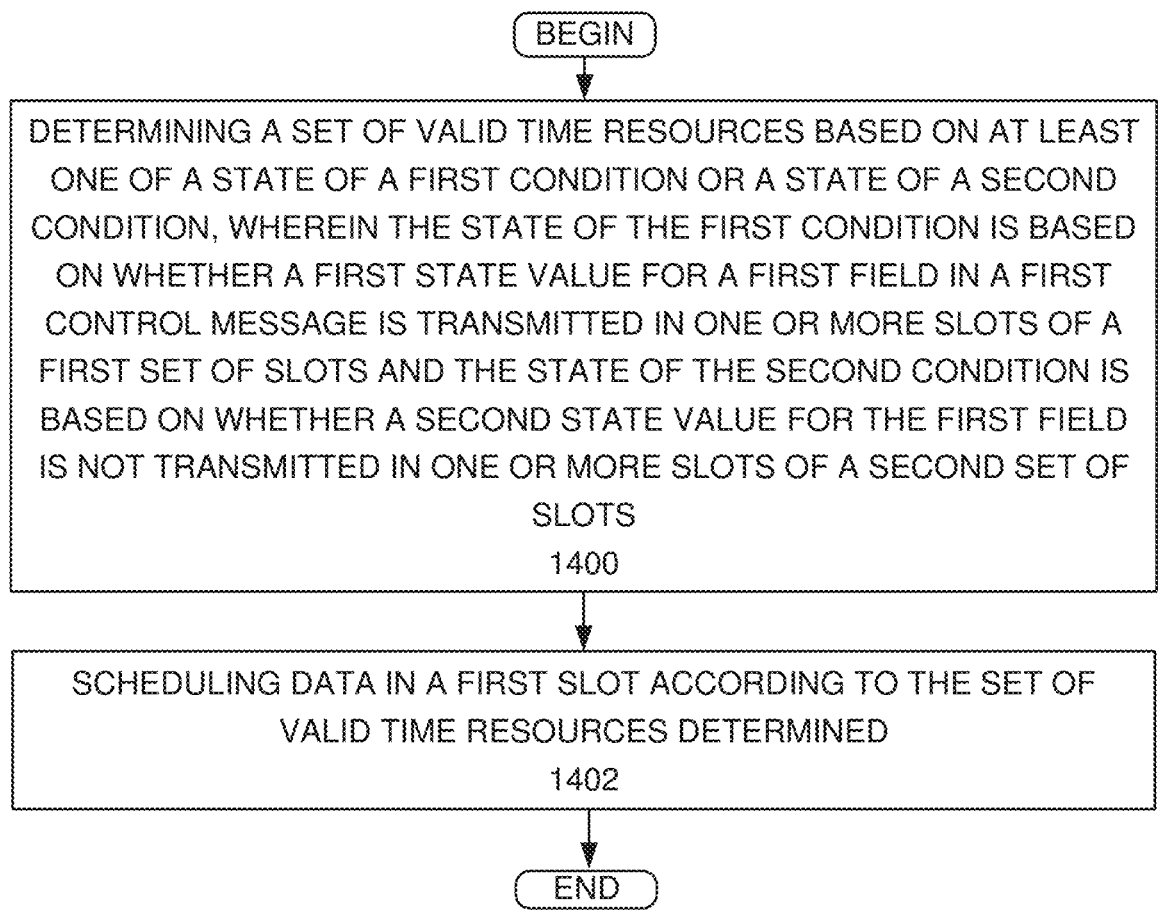
FIG. 14 is a flow chart illustrating operations of a RAN node according to some embodiments of inventive concepts.

Turing to FIG. 14, in operation 1400, the processing circuitry 1003 may determine a set of valid time resources based on at least one of a state of a first condition or a state of a second condition, wherein the state of the first condition is based on whether a first state value for a first field in a first control message is transmitted in one or more slots of a first set of slots and the state of the second condition is based on whether a second state value for the first field is not transmitted in one or more slots of a second set of slots.

The set of valid time resources may be a first set of time resources responsive to the first state value being transmitted or the second state value not being transmitted. The first set of time resources may be time resources with TDRA slot indicator values greater than or equal to a threshold value.

The set of valid time resources may be a second set of time resources responsive to the first state value not being transmitted or the second state value being transmitted. The second set of time resources may be time resources with TDRA slot indicator values including values that are less than the threshold value.

The first number of slots and/or the second number of slots may be determined from the threshold value.

Figure 15:
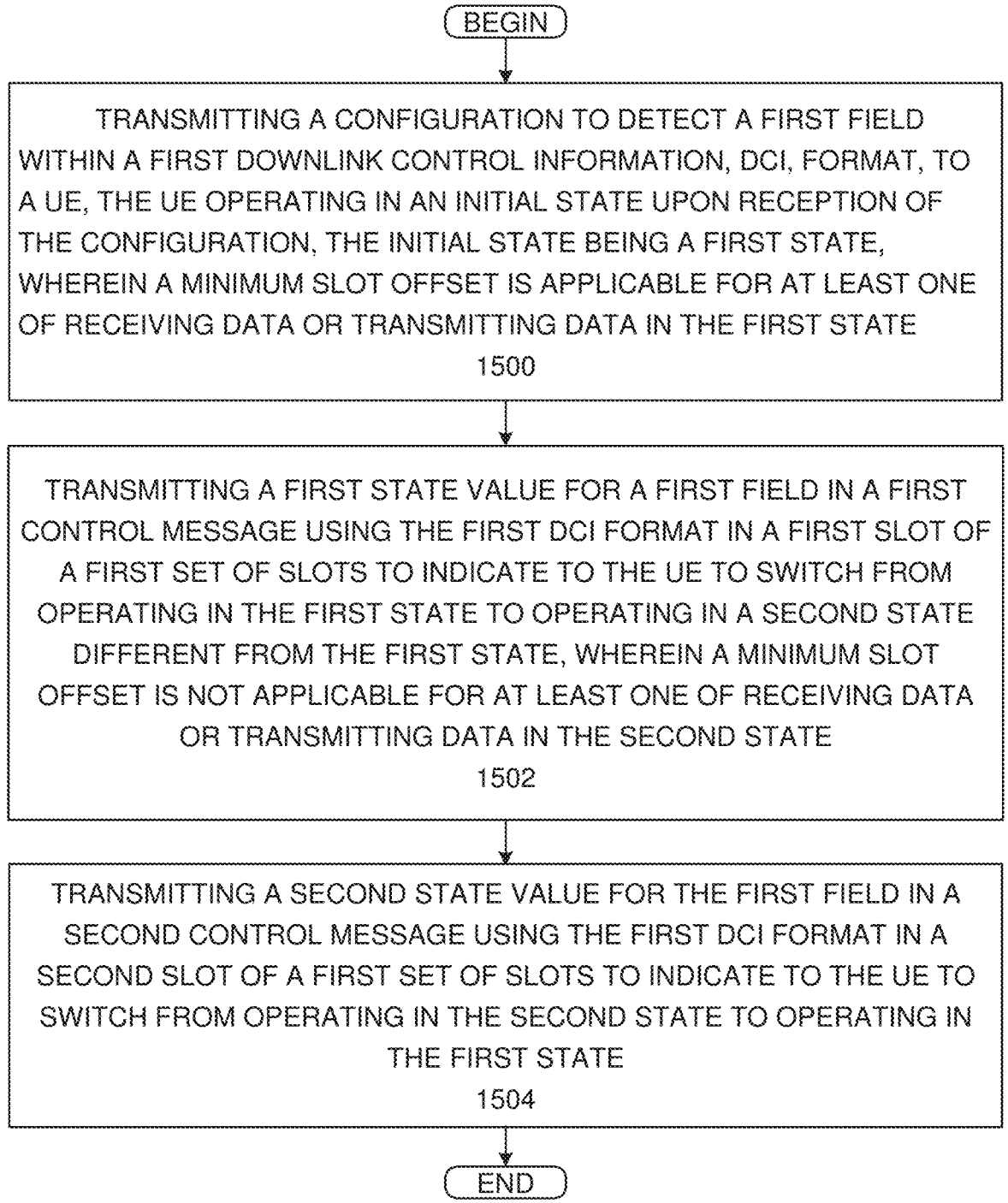
FIG. 15 is a flow chart illustrating further operations of a RAN node according to some embodiments of inventive concepts.

FIG. 15 illustrates a flowchart of further operations of a RAN node. The operations include transmitting 1500 a configuration to detect a first field within a first downlink control information (DCI) format, to a UE, the UE operating in an initial state upon reception of the configuration, the initial state being a first state, wherein a minimum slot offset is applicable for at least one of receiving data or transmitting data in the first state. The operations also include transmitting 1502 a first state value for a first field in a first control message using the first DCI format in a first slot of a first set of slots to indicate to the UE to switch from operating in the first state to operating in a second state different from the first state, wherein a minimum slot offset is not applicable for at least one of receiving data or transmitting data in the second state. The operations also include transmitting 1504 a second state value for the first field in a second control message using the first DCI format in a second slot of a first set of slots to indicate to the UE to switch from operating in the second state to operating in the first state.

The processing circuitry 1003 may transmit the first control message in slot n, wherein the first set of slots includes a first number of slots before slot n, and the first number of slots is obtained from a higher layer configuration.

The second set of slots may include a second number of slots before slot n. The second number of slots may be determined from a higher layer configuration.

In some embodiments, the first control message may be a physical downlink control channel, PDCCH, message assigning downlink resources with DCI format 1-0 or 1-1. In other embodiments, the first control message comprises a physical uplink control channel, PUCCH, message assigning uplink resources with DCI format 0-0 or 0-1.

As can be seen from the above, the inventive concepts include determining whether a UE expects to receive DCI with K0<K0_min in slot n, with the mixed numerology aspects described above.

Example embodiments are discussed below.

Embodiment 1. A method in a user equipment, UE, the method comprising:
  determining (1102) a set of valid time resources based on at least one of a state of a first condition or a state of a second condition, wherein the state of the first condition is based on whether a first state value for a first field in a first control message is detected in one or more slots of a first set of slots and the state of the second condition is whether a second state value for the first field is not detected in one or more slots of a second set of slots; and
  performing (1104) at least one of receiving data and transmitting data in a first slot according to the set of valid time resources determined.

Embodiment 2. The method of Embodiment 1, further comprising determining (1106) a first slot for data transmission and data reception based on scheduling information from a second control message in a second slot and wherein the first slot is a slot in the set of valid time resources.

Embodiment 3. The method of any of Embodiments 1-2, wherein the set of valid time resources comprise a first set of time resources responsive to the first state value being detected or the second state value not being detected.

Embodiment 4. The method of Embodiment 3, wherein the first set of time resources comprises time resources with TDRA slot indicator values greater than or equal to a threshold value.

Embodiment 5. The method of Embodiment 1, wherein the set of valid time resources comprise a second set of time resources responsive to the first state value not being detected or the second state value being detected.

Embodiment 6. The method of Embodiment 5, wherein the second set of time resources comprise time resources with TDRA slot indicator values including values that are less than a threshold value.

Embodiment 7. The method of any of Embodiments 1-6, further comprising receiving (1100) the first control message in slot n, wherein the first set of slots includes a first number of slots before slot n, and the first number of slots is obtained from a higher layer configuration.

Embodiment 8. The method of Embodiment 1 wherein the second set of slots includes a second number of slots before slot n.

Embodiment 9. The method of Embodiment 8, wherein the second number of slots is determined from a higher layer configuration.

Embodiment 10. The method of any of Embodiments 7-8, wherein the first number of slots and/or the second number of slots is determined from the threshold value.

Embodiment 11. The method of any of Embodiments 1-10, wherein the first control message comprises a physical downlink control channel, PDCCH, message assigning downlink resources with DCI format 1-0 or 1-1.

Embodiment 12. The method of any of Embodiments 1-10, wherein the first control message comprises a physical uplink control channel, PUCCH, message assigning uplink resources with DCI format 0-0 or 0-1.

Embodiment 13. The method of any of Embodiments 1-12, wherein the UE is configured with a wakeup signal (WUS), and determining the set of valid time resources comprises determining the set of valid time resources further based on whether the WUS is not detected in one or more slots of a third set of slots with a number of the third set of slots configured by higher layers.

Embodiment 14. The method of any of Embodiments 1-12, wherein determining the set of valid time resources comprises determining the set of valid time resources based on whether a second state value for the first field is not detected in any slot in the second number of slots in a third set of slots and whether a second state value for the first field is detected in a slot subsequent to the second number of slots in the third set of slots.

Embodiment 15. The method of Embodiment 1, wherein determining the set of valid time resources comprises determining the set of valid time resources based on whether a first state value for a first field in a control message is detected in a slot.

Embodiment 16. The method of any of Embodiments 2-15 wherein the first control message and the second control message are a same control message.

Embodiment 17. The method of any of Embodiments 2-16 wherein the second slot is at least a number P slots before the first slot wherein the number P is a second threshold value.

Embodiment 18. The method of any of Embodiments 2-16 wherein the second slot is within a number P slots of the first slot and the number P is a second threshold value.

Embodiment 19. The method of any of Embodiments 1-19 wherein the first slot and the second slot are a same slot.

Embodiment 20. The method of any of Embodiments 1-19 wherein the state of the first condition is further based on whether the first state value for the first field in a first control message is detected in the one or more slots of a first set of slots in a first time window and the state of the second condition is further based on whether the second state value for the first field is not detected in the one or more slots of the second set of slots in a second time window.

Embodiment 21. A method in a user equipment, IE, operating in one of a cross-slot state or a same-slot state, the method comprising:
  while operating in the cross-slot state:
    switching (1200) from operating in the cross-slot state to operating in a same-slot state responsive to detecting a first state value for a first field in a first control message in a first slot of a first set of slots and not detecting a second state value for the first field in the first control message;
    continue operating (1202) in the cross-slot state responsive to not
  detecting the first state value for the first field in a second set of slots; while operating in the same-slot state;
    switching (1204) from operating in the same-slot state to the cross-slot state responsive to not detecting the first state value for the first field in the second set of slots; and
    continue operating (1206) in the same-slot state responsive to not detecting the first state value for the first field in the second set of slots.

Embodiment 22. A method in a user equipment, UE, the method comprising:
  while operating in a cross-slot state:
    responsive to not detecting a first state value for a first field in a first control message in a first slot, switching (1300) to a same-slot state;
    responsive to not detecting any value in the first slot, continue operating (1302) in the cross-slot state; and
  while operating in a same-slot state:
    responsive to detecting the first state value for the first field in the first control message in the first slot, switching (1304) to the cross-slot state; and
    responsive to not detecting any value in the first slot, continue operating (1306) in the same-slot state.

Embodiment 23. A wireless device (900) configured to operate in a communication network, the wireless device comprising:
  processing circuitry (903); and
  memory (905) coupled with the processing circuitry, wherein the memory includes instructions that when executed by the processing circuitry causes the wireless device to perform operations according to any of Embodiments 1-22.

Embodiment 24. A wireless device (900) configured to operate in a communication network, wherein the wireless device is adapted to perform according to any of Embodiments 1-22.

Embodiment 25. A computer program comprising program code to be executed by processing circuitry (903) of a wireless device (900) configured to operate in a communication network, whereby execution of the program code causes the wireless device (900) to perform operations according to any of embodiments 1-22.

Embodiment 26. A computer program product comprising a non-transitory storage medium including program code to be executed by processing circuitry (903) of a wireless device (900) configured to operate in a communication network, whereby execution of the program code causes the wireless device (900) to perform operations according to any of embodiments 1-22.

Embodiment 27. A method in a radio access node, RAN, the method comprising:
  determining (1400) a set of valid time resources based on at least one of a state of a first condition or a state of a second condition, wherein the state of the first condition is based on whether a first state value for a first field in a first control message is transmitted in one or more slots of a first set of slots and the state of the second condition is based on whether a second state value for the first field is not transmitted in one or more slots of a second set of slots; and
  scheduling (1402) data in a first slot according to the set of valid time resources determined.

Embodiment 28. The method of Embodiment 27, wherein the set of valid time resources comprise a first set of time resources responsive to the first state value being transmitted or the second state value not being transmitted.

Embodiment 29. The method of Embodiment 28, wherein the first set of time resources comprises time resources with TDRA slot indicator values greater than or equal to a threshold value.

Embodiment 30. The method of Embodiment 27, wherein the set of valid time resources comprise a second set of time resources responsive to the first state value not being transmitted or the second state value being transmitted.

Embodiment 31. The method of Embodiment 30, wherein the second set of time resources comprise time resources with TDRA slot indicator values including values that are less than a threshold value.

Embodiment 32. The method of any of Embodiments 27-31, further comprising transmitting the first control message in slot n, wherein the first set of slots includes a first number of slots before slot n, and the first number of slots is obtained from a higher layer configuration.

Embodiment 33. The method of Embodiment 27 wherein the second set of slots includes a second number of slots before slot n.

Embodiment 34. The method of Embodiment 33, wherein the second number of slots is determined from a higher layer configuration.

Embodiment 35. The method of any of Embodiments 33-34, wherein the first number of slots and/or the second number of slots is determined from the threshold value.

Embodiment 36. The method of any of Embodiments 27-35, wherein the first control message comprises a physical downlink control channel, PDCCH, message assigning downlink resources with DC format 1-0 or 1-1.

Embodiment 37. The method of any of Embodiments 27-35, wherein the first control message comprises a physical uplink control channel, PUCCH, message assigning uplink resources with DCI format 0-0 or 0-1.

Embodiment 38. A radio access network, RAN, node (1000) configured to operate in a communication network, the RAN node comprising:
processing circuitry (1003); and
memory (1005) coupled with the processing circuitry, wherein the memory includes instructions that when executed by the processing circuitry causes the RAN node to perform operations according to any of Embodiments 27-37.

Embodiment 39. A first radio access network, RAN, node (400) configured to operate in a communication network, wherein the RAN node is adapted to perform according to any of Embodiments 27-37.

Embodiment 40. A computer program comprising program code to be executed by processing circuitry (403) of a radio access network, RAN, node (400) configured to operate in a communication network, whereby execution of the program code causes the RAN node (400) to perform operations according to any of embodiments 27-37.

Embodiment 41. A computer program product comprising a non-transitory storage medium including program code to be executed by processing circuitry (403) of a radio access network, RAN, node (400) configured to operate in a communication network, whereby execution of the program code causes the RAN node (400) to perform operations according to any of embodiments 27-37.

Explanations are provided below for various abbreviations/acronyms used in the present disclosure.
Abbreviation Explanation
3GPP 3rd Generation Partnership Project
5G 5th Generation
ACK/NACK Acknowledgment/Not-acknowledgment
BWP Bandwidth Part
TBS Transport block size
SCS Subcarrier spacing
eMBB enhanced Mobile BroadBand
gNB A radio base station in 5G/NR.
HARQ Hybrid Automatic Repeat Request
LTE Long Term Evolution
MTC Machine Type Communication
NR Next Radio/New Radio
PDCCH Physical Downlink Control Channel
PDSCH Physical Downlink Shared Channel
PUSCH Physical Uplink Shared Channel
UE User Equipment
URLLC Ultra-Reliable and Low Latency Communication
WUS Wake-up Signal
CC Component carrier
References are identified below.
3GPP TS 38.214, v 15,6.0, NR, Physical layer procedures for data (Release 15)
3GPP TS 38.213, v. 15.6.0, NR; Physical layer procedures for control (Release 15)
Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 16:
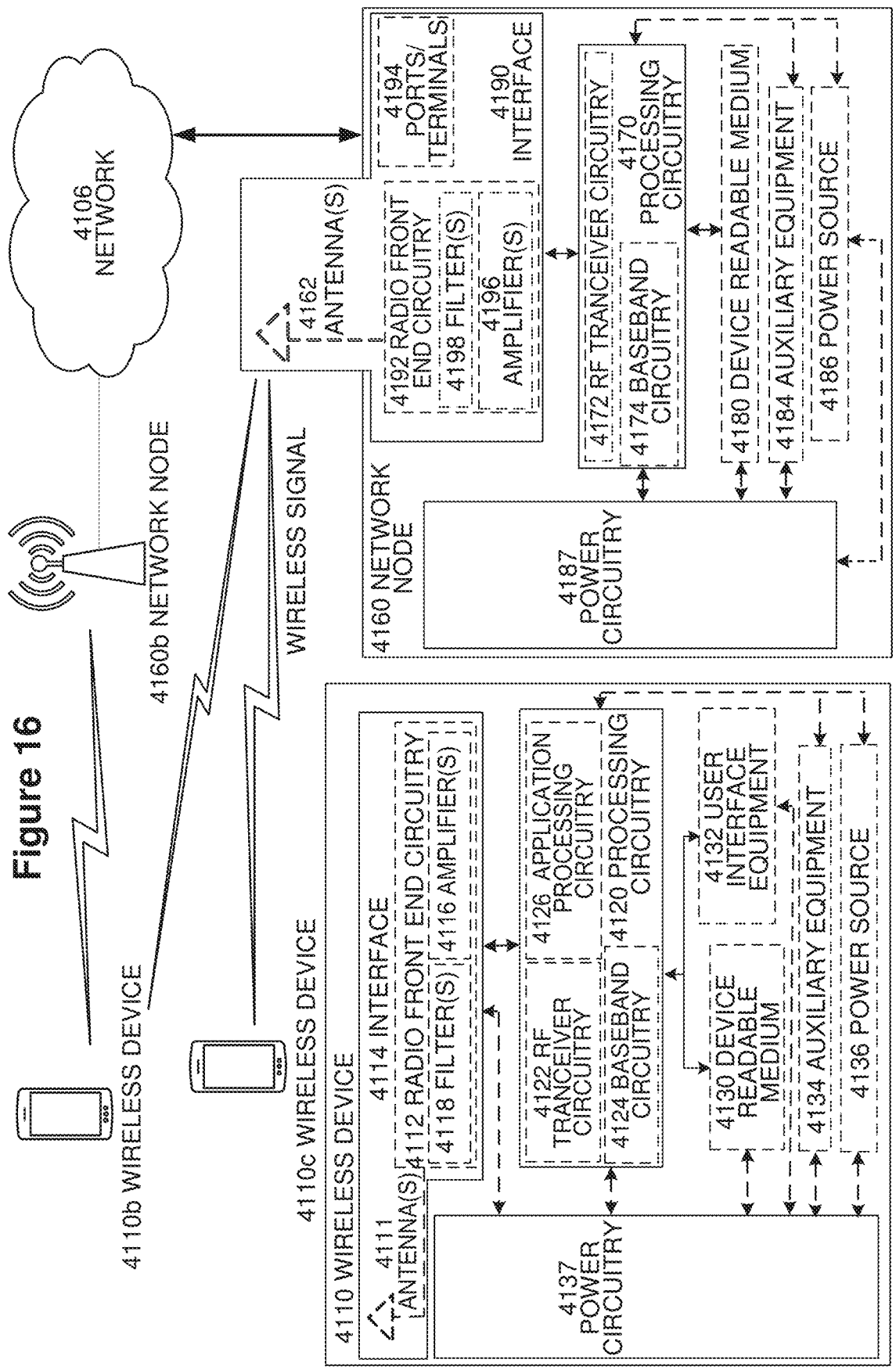
FIG. 16 is a block diagram of a wireless network in accordance with some embodiments.

FIG. 16 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs)(e.g., radio access points), base stations (BSs)(e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 411 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data, and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 16 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME) a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4114 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source: in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 17:
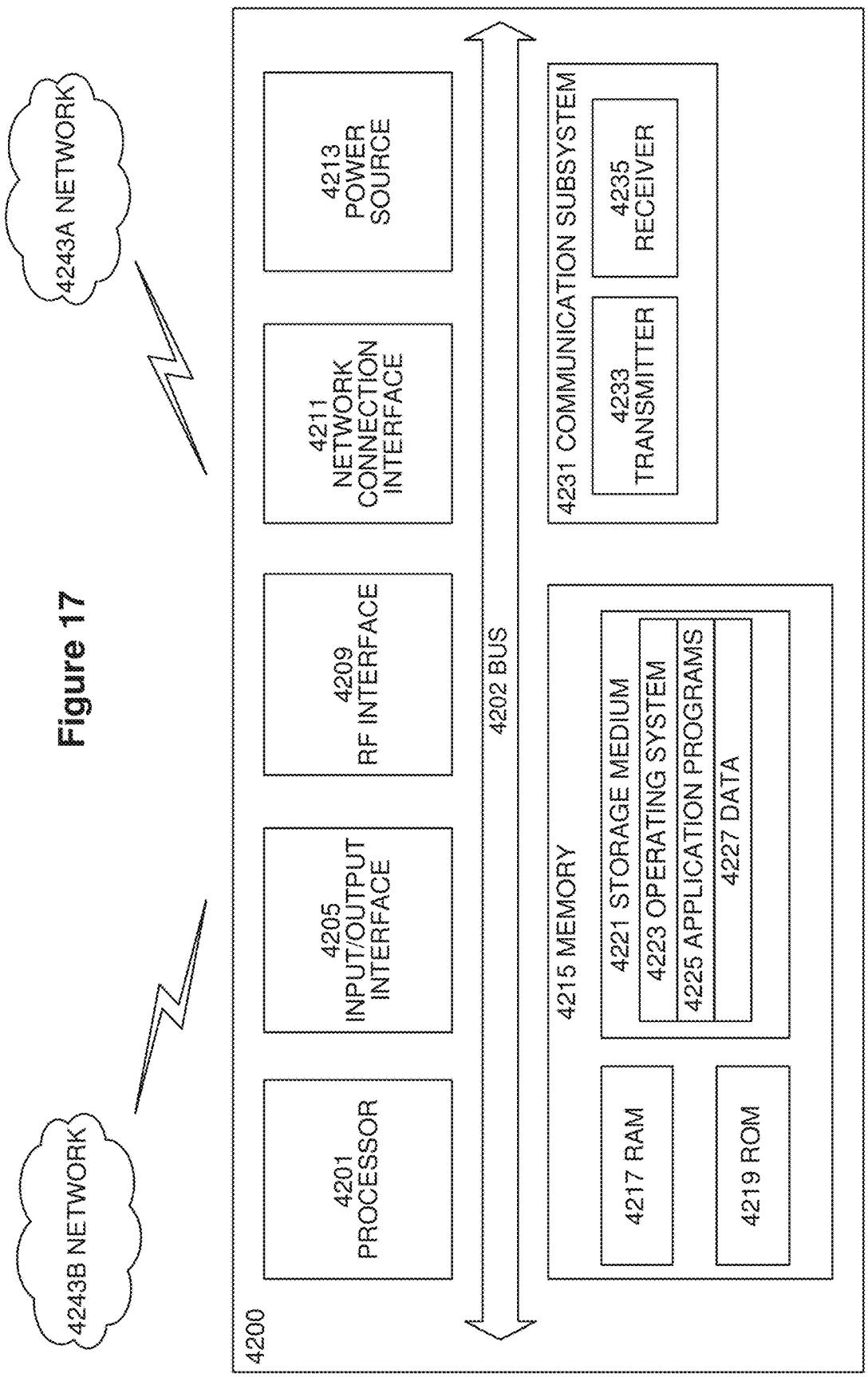
FIG. 17 is a block diagram of a user equipment in accordance with some embodiments.

FIG. 17 illustrates a user Equipment in accordance with some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 17, is one example of a WD configured for communication in accordance with one or more communication standards promulgated by the 3rd Generation Partnership Project (3GPP), such as 3GPP's GSM, UMTS. LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4233, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware: one or more stored program, general-purpose processors, such as a microprocessor or Digital Signal Processor (DSP), together with appropriate software: or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 17, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.42, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 18:
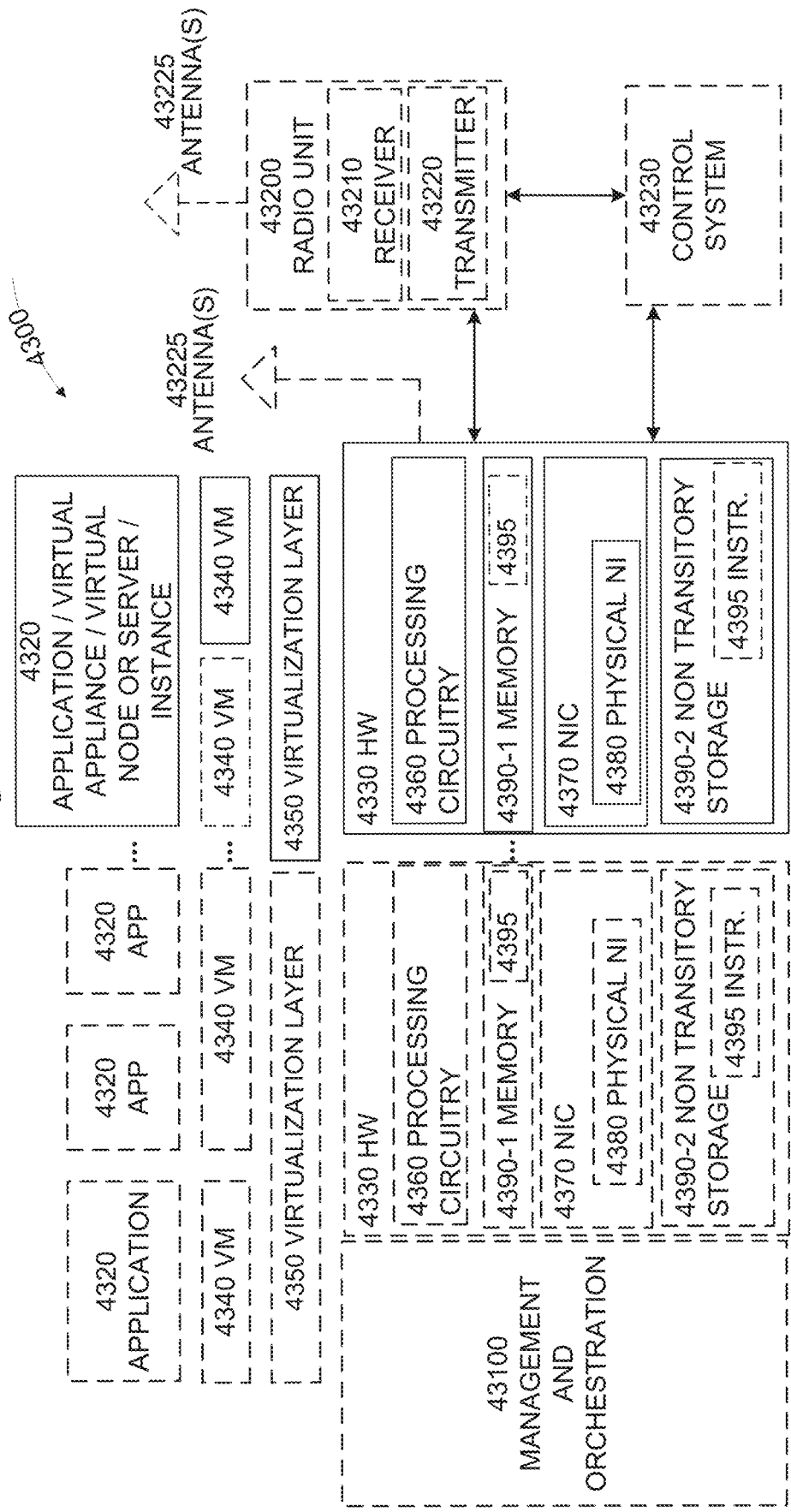
FIG. 18 is a block diagram of a virtualization environment in accordance with some embodiments.

FIG. 18 illustrates a virtualization environment in accordance with some embodiments.

FIG. 18 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340, comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 18, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV. Virtual Network Function (VNF) is responsible for handling specific network functions that run in one or more virtual machines 4340 on top of hardware networking infrastructure 4330 and corresponds to application 4320 in FIG. 18.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 19:
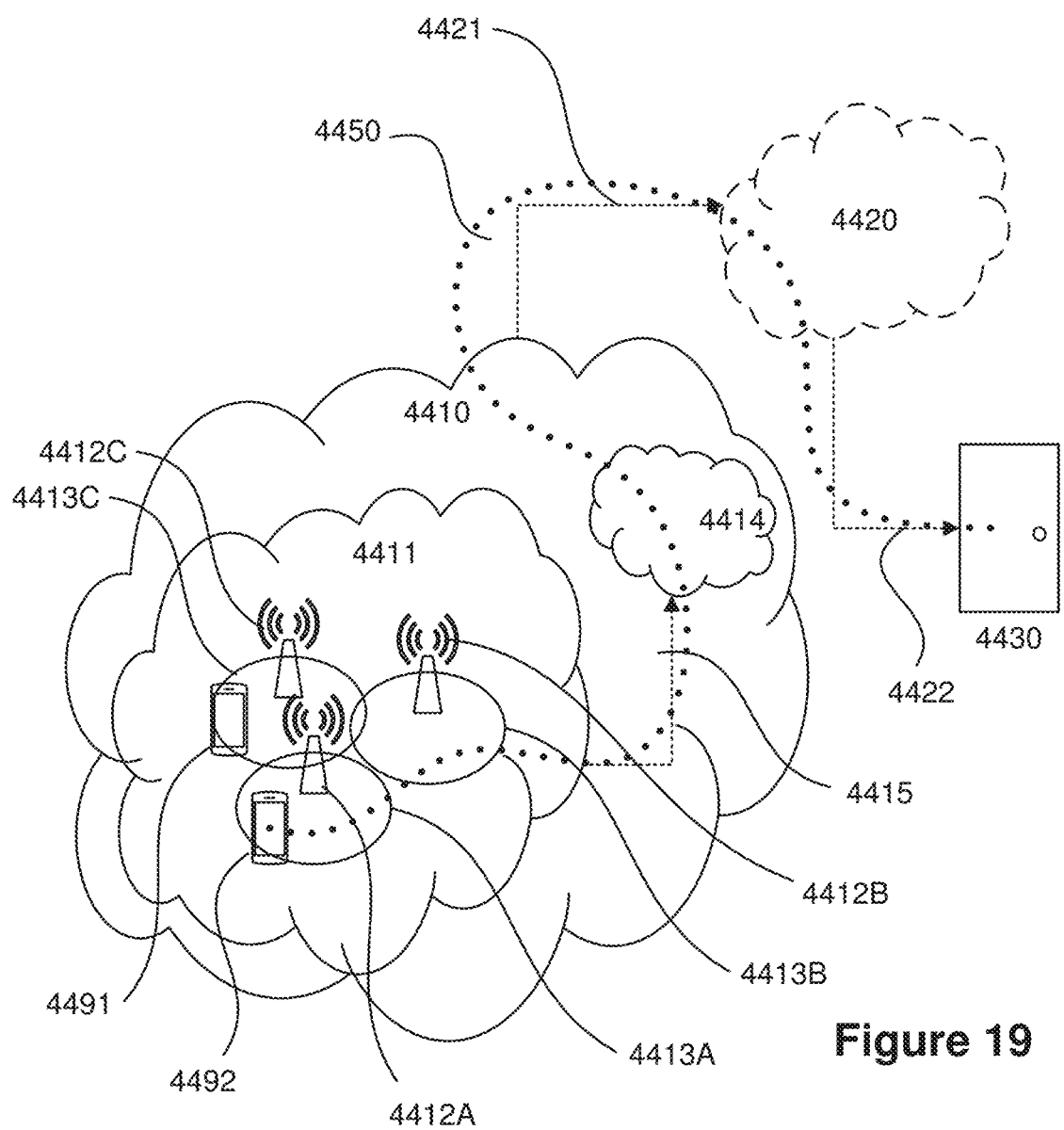
FIG. 19 is a block diagram of a telecommunication network connected via an intermediate network to a host computer in accordance with some embodiments.

FIG. 19 illustrates a telecommunication network connected via an intermediate network to a host computer in accordance with some embodiments.

With reference to FIG. 19, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network: intermediate network 4420, if any, may be a backbone network or the Internet; in particular, intermediate network 4420 may comprise two or more sub-networks (not shown).

The communication system of FIG. 19 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 20:
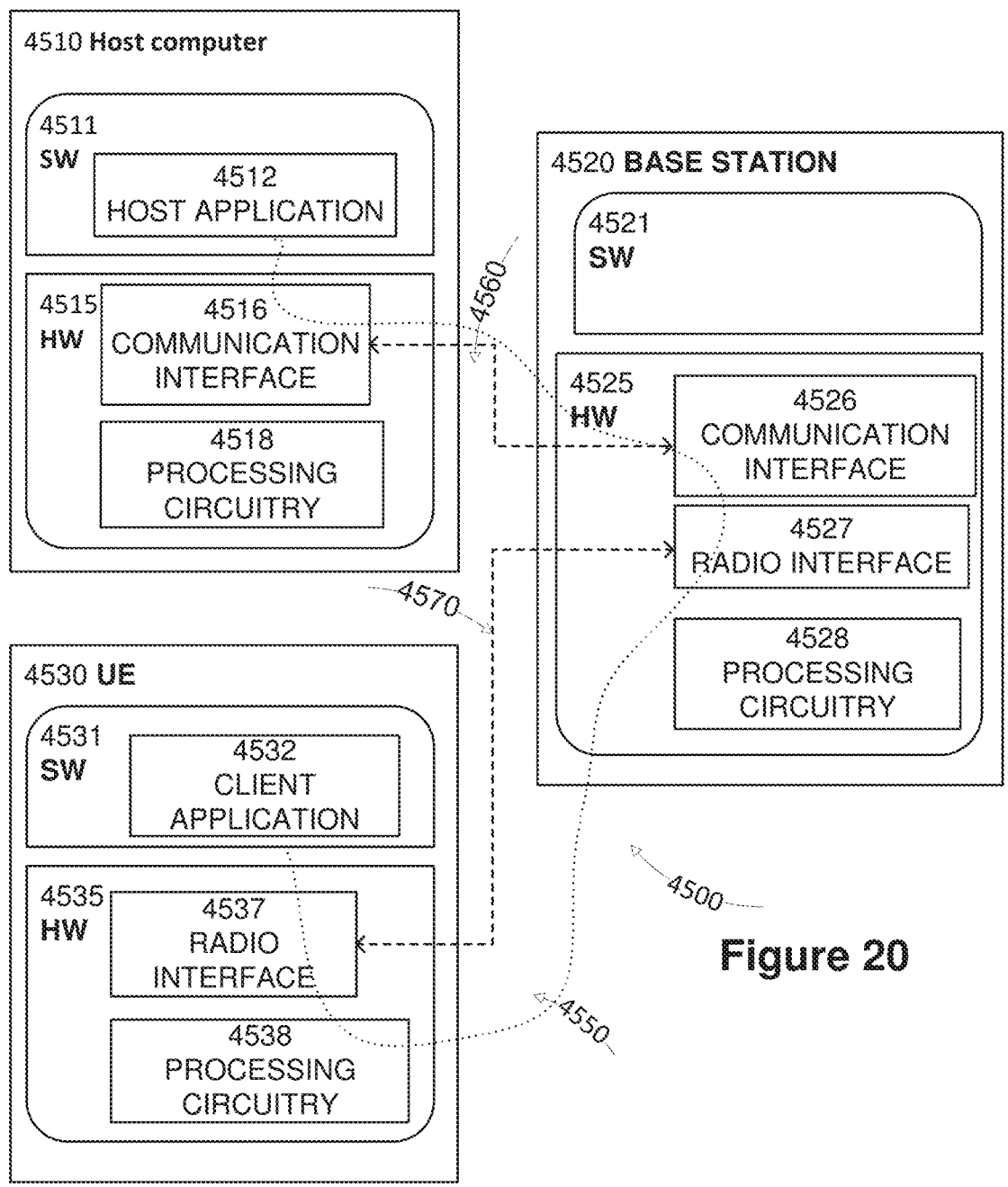
FIG. 20 is a block diagram of a host computer communicating via a base station with a user equipment over a partially wireless connection in accordance with some embodiments.

FIG. 20 illustrates a host computer communicating via a base station with a user equipment over a partially wireless connection in accordance with some embodiments.

Example implementations, in accordance with an embodiment, of the UE. base station and host computer discussed in the preceding paragraphs will now be described with reference to FIG. 20. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 20) served by base station 4520. Communication interface 4526 may be configured to facilitate connection 4560 to host computer 4510. Connection 4560 may be direct or it may pass through a core network (not shown in FIG. 20) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 20 may be similar or identical to host computer 4430, one of base stations 4412*a*, 4412*b*, 4412*c* and one of UEs 4491, 4492 of FIG. 19, respectively. This is to say, the inner workings of these entities may be as shown in FIG. 20 and independently, the surrounding network topology may be that of FIG. 19.

In FIG. 20, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 23 illustrates methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 24 illustrates methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to preform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CS-RNTI Configures Scheduling RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
POW Packet Gateway
PHICH Physical Hybrid-ARQ Indicator Channel
PLMN Public Land Mobile Network
PMI Precoder Matrix Indicator
PEACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
S1 System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled" "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising". "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from amore general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method in a user equipment, UE, the method comprising:
receiving a first field within a first downlink control information, DCI, format, the UE operating in an initial state upon reception of the first field, the initial state being a first state;
while operating in the first state where a minimum slot offset is applicable for at least one of receiving data or transmitting data:
switching from operating in the first state to operating in a second state responsive to detecting a first state value for the first field in a first control message using the first DCI format in a first slot of a first set of slots, wherein the UE switches to operate in the second state after a first application delay regardless of the receiving a state value different from the first value in between the first slot and the first application delay; and
while operating in the second state where the minimum slot offset is not applicable for at least one of receiving the data and transmitting the data:
switching from operating in the second state to the first state responsive to detecting a second state value for the first field in the first slot of a second set of slots, wherein the UE switches to operate in the first state after a second application delay regardless of the receiving a state value different from the second value in between the first slot of the second set of slots and the application delay.

2. The method of claim 1 wherein the first state is a cross-slot state and the second state is a same-slot state.

3. The method of claim 1, wherein the application delays are defined as the minimum slot offset multiplied with the ratio of the numerologies of the control channel, PDCCH, and the data channel, PDSCH.

4. The method of claim 1 wherein the minimum slot offset comprises a slot offset between the slot in which PDCCH is located and the slot for PDSCH reception or PUSCH transmission.

5. The method of claim 1 wherein the configuration to detect the first field within the first DCI is independent for downlink, DL, and uplink, UL, DCI.

6. The method of claim 1, wherein the first state is in a different numerology scheduling than the second state and switching from operating in the first state to operating in the second state comprises switching from operating in the first state to operating in the second state after a mixed numerology application delay scaled with PDCCH numerology in a numerator and PDSCH numerology in a denominator and switching from operating in the second state to operating in the first state comprises switching from operating in the second state to operating in the first state after the mixed numerology application delay.

7. The method of claim 1, wherein the first DCI format is one of a DCI format scheduling downlink, and the minimum scheduling offset is applicable for receiving data, or a DCI format scheduling uplink, and the minimum scheduling offset is applicable for transmitting data.

8. The method of claim 1, wherein the first DCI format is one of a DCI format scheduling downlink or a DCI format scheduling uplink, and wherein the first DCI format controls the minimum scheduling offset applicable for transmitting data and minimum scheduling offset applicable for receiving data.

9. A wireless device configured to operate in a communication network, the wireless device comprising:
processing circuitry; and
memory coupled with the processing circuitry, wherein the memory includes instructions that when executed by the processing circuitry causes the wireless device to perform operations comprising:
receiving a first field within a first downlink control information, DCI, format, the UE operating in an initial state upon reception of the first field, the initial state being a first state;
while operating in the first state where a minimum slot offset is applicable for at least one of receiving data or transmitting data:
switching from operating in the first state to operating in a second state responsive to detecting a first state value for the first field in a first control message using the first DCI format in a first slot of a first set of slots, wherein the UE switches to operate in the second state after a first application delay regardless of the receiving a state value different from the first value in between the first slot and the first application delay; and
while operating in the second state where the minimum slot offset is not applicable for at least one of receiving the data and transmitting the data:
switching from operating in the second state to the first state responsive to detecting a second state value for the first field in the first slot of a second set of slots, wherein the UE switches to operate in the first state after a second application delay regardless of the receiving a state value different from the second value in between the first slot of the second set of slots and the application delay.

10. The wireless device of claim 9 wherein the first state is a cross-slot state and the second state is a same-slot state.

11. The wireless device of claim 9, wherein the application delays are defined as the minimum slot offset multiplied with the ratio of the numerologies of the control channel, PDCCH, and the data channel, PDSCH.

12. The wireless device of claim 9 wherein the minimum slot offset comprises a slot offset between the slot in which PDCCH is located and the slot for PDSCH reception or PUSCH transmission.

13. The wireless device of claim 9 wherein the configuration to detect the first field within the first DCI is independent for downlink, DL, and uplink, UL DCI.

14. The wireless device of claim 9, wherein the first state is in a different numerology scheduling than the second state and in switching from operating in the first state to operating in the second state, the memory includes instructions that when executed by the processing circuitry causes the wireless device to perform operations comprising switching from operating in the first state to operating in the second state after a mixed numerology application delay scaled with PDCCH numerology in a numerator and PDSCH numerology in a denominator and in switching from operating in the second state to operating in the first state, the memory includes instructions that when executed by the processing circuitry causes the wireless device to perform operations comprising switching from operating in the second state to operating in the first state after the mixed numerology application delay.

15. The wireless device of claim 9, wherein the first DCI format is one of a DCI format scheduling downlink, and the minimum scheduling offset is applicable for receiving data, or a DCI format scheduling uplink, and the minimum scheduling offset is applicable for transmitting data.

16. The wireless device of claim 9, wherein the first DCI format is one of a DCI format scheduling downlink or a DCI format scheduling uplink, and wherein the first DCI format controls the minimum scheduling offset applicable for transmitting data and minimum scheduling offset applicable for receiving data.

* * * * *

UNITED STATES PATENT AND TRADEMARK OFFICE
CERTIFICATE OF CORRECTION

PATENT NO. : 12,075,437 B2
APPLICATION NO. : 17/635443
DATED : August 27, 2024
INVENTOR(S) : Nimbalker et al.

It is certified that error appears in the above-identified patent and that said Letters Patent is hereby corrected as shown below:

In the Drawings

In Fig. 8, Sheet 7 of 20, delete "KO=16" and insert -- K0=16 --, therefor.

In Fig. 8, Sheet 7 of 20, delete "KO=2" and insert -- K0=2 --, therefor.

In Fig. 8, Sheet 7 of 20, delete "KO=8" and insert -- K0=8 --, therefor.

In Fig. 16, Sheet 14 of 20, Tag "4172", in Line 1, delete "TRANCEIVER" and insert -- TRANSCEIVER --, therefor.

In Fig. 16, Sheet 14 of 20, Tag "4122", in Line 2, delete "TRANCEIVER" and insert -- TRANSCEIVER --, therefor.

In the Specification

In Column 1, Line 50, delete "DRY" and insert -- DRX --, therefor.

In Column 1, Line 59, delete "(NR)(e.g.," and insert -- (NR) (e.g., --, therefor.

In Column 2, Lines 41-42, delete "network," and insert -- network. --, therefor.

In Column 2, Lines 63-64, delete "[log $_2(N_{RB}^{DL,}{}_{BWP}(N_{RB}^{DL,BWP}+1)/2)$]bits" and insert -- [$\log_2(N_{RB}^{DL,BWP}(N_{RB}^{DL,BWP}+1)/2)$]bits --, therefor.

In Column 3, Line 23, delete "92.3" and insert -- 9.2.3 --, therefor.

In Column 3, Line 35, delete "tinier" and insert -- timer --, therefor.

In Column 3, Line 44, delete "operation" and insert -- operation. --, therefor.

Signed and Sealed this
Thirteenth Day of May, 2025

Coke Morgan Stewart
*Acting Director of the United States Patent and Trademark Office*

CERTIFICATE OF CORRECTION (continued)

U.S. Pat. No. 12,075,437 B2

In Column 5, Line 3, delete "account:" and insert -- account; --, therefor.

In Column 5, Line 5, delete "account:" and insert -- account; --, therefor.

In Column 5, Line 10, delete "Interaction:" and insert -- Interaction; --, therefor.

In Column 6, Line 36, delete "b" and insert -- b) --, therefor.

In Column 6, Line 53, delete "station(s)(e.g.," and insert -- station(s) (e.g., --, therefor.

In Column 7, Line 35, delete "(e.g." and insert -- (e.g., --, therefor.

In Column 8, Line 5, delete "1.1" and insert -- L1 --, therefor.

In Column 8, Line 29, delete "K1," and insert -- K2, --, therefor.

In Column 8, Line 36, delete "on or more" and insert -- one or more --, therefor.

In Column 8, Line 38, delete "field in" and insert -- field is --, therefor.

In Column 9, Line 62, delete "n-X; or" and insert -- n-X, or --, therefor.

In Column 10, Line 2, delete "n-Y" and insert -- n-Y. --, therefor.

In Column 10, Line 27, delete "UT" and insert -- UE --, therefor.

In Column 10, Line 63, delete "gNB" and insert -- gNB to --, therefor.

In Column 11, Line 10, delete "PDSCH" and insert -- PDSCH. --, therefor.

In Column 11, Line 19, delete "see" and insert -- sec --, therefor.

In Column 11, Line 51, delete "n-Y" and insert -- n-Y. --, therefor.

In Column 12, Line 28, delete "CSIF=0:" and insert -- CSIF=0 --, therefor.

In Column 12, Line 50, delete "PDSCH)" and insert -- PDSCH). --, therefor.

In Column 13, Line 62, delete "consistent." and insert -- consistent, --, therefor.

In Column 14, Line 20, delete "n-Z); or" and insert -- n-Z), or --, therefor.

In Column 14, Line 21, delete "n." and insert -- n, --, therefor.

In Column 14, Line 29, delete "n-Y" and insert -- n-Y. --, therefor.

CERTIFICATE OF CORRECTION (continued)
U.S. Pat. No. 12,075,437 B2

In Column 15, Line 4, delete "Ko_min1)." and insert -- K0_min1). --, therefor.

In Column 15, Line 11, delete "k0<K0_min2" and insert -- k0<K0_min2. --, therefor.

In Column 15, Line 20, delete "n-Y" and insert -- n-Y. --, therefor.

In Column 15, Line 28, delete "n, or" and insert -- n; or --, therefor.

In Column 15, Line 30, delete "n-YL" and insert -- n-YL; or --, therefor.

In Column 15, Line 33, delete "n-Y L" and insert -- n-YL --, therefor.

In Column 15, Line 33, delete "n-YL-X" and insert -- n-YL-X. --, therefor.

In Column 15, Line 44, delete "sent 1" and insert -- sent K1 --, therefor.

In Column 15, Line 57, delete "K2-min" and insert -- K2_min --, therefor.

In Column 16, Line 28, delete "supported" and insert -- supported: --, therefor.

In Column 16, Line 66, delete "the a" and insert -- the --, therefor.

In Column 17, Line 42, delete "is" and insert -- in --, therefor.

In Column 19, Line 24, delete "Turing" and insert -- Turning --, therefor.

In Column 21, Line 42, delete "ofany" and insert -- of any --, therefor.

In Column 21, Line 50, delete "IE," and insert -- UE, --, therefor.

In Column 23, Line 24, delete "DC" and insert -- DCI --, therefor.

In Column 24, Line 11, delete "15,6.0," and insert -- 15.6.0, --, therefor.

In Column 25, Line 5, delete "(UMTS)." and insert -- (UMTS), --, therefor.

In Column 25, Line 39, delete "(APs)(e.g.," and insert -- (APs) (e.g., --, therefor.

In Column 25, Line 40, delete "(BSs)(e.g.," and insert -- (BSs) (e.g., --, therefor.

In Column 26, Line 7, delete "FIG. 411" and insert -- FIG. 16 --, therefor.

In Column 27, Line 14, delete "units" and insert -- units. --, therefor.

In Column 28, Line 28, delete "4190" and insert -- 4192 --, therefor.

CERTIFICATE OF CORRECTION (continued)
U.S. Pat. No. 12,075,437 B2

In Column 28, Line 46, delete "data," and insert -- data --, therefor.

In Column 29, Line 42, delete "(LME)" and insert -- (LME), --, therefor.

In Column 29, Line 43, delete "(CPE)." and insert -- (CPE), --, therefor.

In Column 29, Line 47, delete "(V21)," and insert -- (V2I), --, therefor.

In Column 29, Line 61, delete "etc.) personal" and insert -- etc.), personal --, therefor.

In Column 30, Line 31, delete "4114" and insert -- 4112 --, therefor.

In Column 32, Line 55, delete "source:" and insert -- source; --, therefor.

In Column 33, Line 12, delete "42200" and insert -- 4200 --, therefor.

In Column 33, Line 19, delete "UMTS." and insert -- UMTS, --, therefor.

In Column 33, Line 21, delete "interchangeable." and insert -- interchangeably. --, therefor.

In Column 33, Line 48, delete "firmware:" and insert -- firmware; --, therefor.

In Column 33, Line 51, delete "software:" and insert -- software; --, therefor.

In Column 36, Line 38, delete "memory 4390. Memory 4390" and insert -- memory 4390-1. Memory 4390-1 --, therefor.

In Column 37, Line 37, delete "NFV." and insert -- NFV, --, therefor.

In Column 38, Line 22, delete "network:" and insert -- network; --, therefor.

In Column 38, Line 50, delete "UE." and insert -- UE, --, therefor.

In Column 40, Line 27, delete "both" and insert -- both. --, therefor.

In Column 40, Line 41, delete "computer 4510's" and insert -- computer 4510 --, therefor.

In Column 40, Line 49, delete "embodiments" and insert -- embodiments. --, therefor.

In Column 42, Line 14, delete "preform" and insert -- perform --, therefor.

In Column 42, Line 15, delete "according" and insert -- according to --, therefor.

In Column 42, Line 42, delete "Carrier Component" and insert -- Component Carrier --, therefor.

CERTIFICATE OF CORRECTION (continued)
U.S. Pat. No. 12,075,437 B2

In Column 42, Line 44, delete "Code Division Multiplexing Access" and insert -- Code-Division Multiple Access --, therefor.

In Column 42, Line 45, delete "Cell Global Identifier" and insert -- Cell Global Identity --, therefor.

In Column 43, Line 40, delete "Profile Delay Profile" and insert -- Power Delay Profile --, therefor.

In Column 43, Line 45, delete "Precoder Matrix Indicator" and insert -- Precoding Matrix Indicator --, therefor.

In Column 43, Line 46, delete "PEACH" and insert -- PRACH --, therefor.

In Column 43, Line 55, delete "Radio Link Management" and insert -- Radio Link Monitoring --, therefor.

In Column 44, Line 6, delete "S1" and insert -- SI --, therefor.

In Column 44, Line 9, delete "Self Optimized Network" and insert -- Self-Organizing Network --, therefor.

In Column 44, Line 25, delete "Wide CDMA" and insert -- Wideband CDMA --, therefor.

In Column 44, Line 26, delete "Wide Local Area Network" and insert -- Wireless Local-Area Network --, therefor.

In Column 44, Line 38, delete "terms" and insert -- terms, --, therefor.

In Column 45, Line 4, delete ""comprising"." and insert -- "comprising", --, therefor.

In Column 45, Line 17, delete "amore" and insert -- a more --, therefor.